United States Patent [19]

Short

[11] Patent Number: 4,821,101

[45] Date of Patent: Apr. 11, 1989

[54] VIDEO SYSTEM, METHOD AND APPARATUS

[75] Inventor: Michael P. Short, San Jose, Calif.

[73] Assignee: Isix, Inc., Foster City, Calif.

[21] Appl. No.: 16,671

[22] Filed: Feb. 19, 1987

[51] Int. Cl.⁴ .................. H04N 7/04; H04N 5/262
[52] U.S. Cl. .................... 358/181; 358/185; 358/143; 358/145
[58] Field of Search .......... 358/181, 185, 147, 145, 358/143, 160, 142, 88, 89, 102, 183

[56] References Cited

U.S. PATENT DOCUMENTS

| | | |
|---|---|---|
| 2,681,383 | 6/1954 | Loe . |
| 3,051,777 | 8/1962 | Lemelson . |
| 3,061,669 | 10/1962 | Leek . |
| 3,202,764 | 8/1965 | Adams et al. . |
| 3,391,247 | 7/1968 | Frohbach .................... 358/145 X |
| 3,488,435 | 1/1970 | Eilenberger . |
| 3,493,674 | 2/1970 | Houghton . |
| 3,580,998 | 5/1971 | Hammond et al. . |
| 3,586,767 | 6/1971 | Morchand . |
| 3,637,926 | 1/1972 | Morchand . |
| 3,697,675 | 10/1972 | Beard et al. . |
| 3,700,793 | 10/1972 | Borsuk et al. . |
| 3,725,571 | 4/1973 | Justice . |
| 3,740,465 | 6/1973 | Dorsey . |
| 3,743,767 | 7/1973 | Bitzer et al. . |
| 3,745,242 | 7/1973 | Justice . |
| 3,746,780 | 7/1973 | Sletten et al. . |
| 3,751,595 | 8/1973 | Moses . |
| 3,889,063 | 6/1975 | Slavin . |
| 3,896,487 | 7/1975 | Tesler ..................... 358/3 |
| 3,902,007 | 8/1975 | Justice . |
| 3,991,266 | 11/1976 | Baer . |
| 4,027,333 | 5/1977 | Kaiser et al. ................. 358/146 |
| 4,052,719 | 10/1977 | Hutt et al. ................. 340/324 AD |
| 4,097,692 | 6/1978 | Felix . |
| 4,115,662 | 7/1978 | Guinet et al. . |
| 4,161,786 | 7/1979 | Hopkins et al. ................. 364/900 |
| 4,170,832 | 10/1979 | Zimmerman . |
| 4,199,656 | 4/1980 | Saylor . |
| 4,205,343 | 5/1980 | Barrett ........................ 358/147 |
| 4,233,628 | 11/1980 | Ciciora ........................ 358/147 |
| 4,266,240 | 5/1981 | Levy .............................. 358/3 |
| 4,278,993 | 7/1981 | Suzuki ......................... 358/22 |
| 4,287,528 | 9/1981 | Levy .............................. 358/3 |
| 4,393,404 | 7/1983 | Cox et al. .................... 358/147 |
| 4,419,920 | 12/1983 | Ole ........................... 358/143 X |
| 4,467,356 | 8/1984 | McCoy ........................ 358/146 |
| 4,484,328 | 11/1984 | Schlafly ......................... 370/85 |
| 4,510,520 | 4/1985 | Parker et al. ................... 358/12 |
| 4,514,760 | 4/1985 | Balaban et al. ............ 358/198 X |
| 4,532,547 | 7/1985 | Bennett ........................ 358/148 |
| 4,535,356 | 8/1985 | Nakagawa et al. ........ 358/142 X |
| 4,593,318 | 6/1986 | Eng et al. ..................... 358/142 |
| 4,656,512 | 4/1987 | Devino ........................ 358/143 |
| 4,658,291 | 4/1987 | Morishita ..................... 358/92 |
| 4,672,434 | 6/1987 | Suzuki et al. .................. 358/88 |

FOREIGN PATENT DOCUMENTS

| | | |
|---|---|---|
| 0079426 | 7/1978 | Japan ........................ 358/145 |
| 1420106 | 1/1976 | United Kingdom .......... 358/145 |

Primary Examiner—Howard W. Britton
Assistant Examiner—Victor R. Kostak
Attorney, Agent, or Firm—A. C. Smith

[57] ABSTRACT

An improved system, apparatus and method are disclosed for interleaving selected video fields of multiple displayable programs to facilitate viewer selection of which programs to display. Selected video fields are stored and continuously displayed until a new, successive video field is selected to update the currently stored video field. In this manner, a sequence of rapidly updated, fixed or frozen video fields provides the appearance of continuous movement of displayed images. Audio signals are included in the video fields of displayable programs to provide audio signals in synchronism with selected video fields. The sequence of interleaved video fields may be assembled in real time or stored as a video tape recording, and the information need to re-assemble correlated video fields of a selector displayable program from the sequence of interleaved video fields is included in the horizontal scans or traces of each video field in the sequence.

10 Claims, 19 Drawing Sheets

VIDEO CELL LEVELS IN IRE UNITS
REFERENCE WHITE = 100  REFERENCE BLACK = 7.5
BLANKING = 0  SYNC = -40  BURST AMPLITUDE = 40

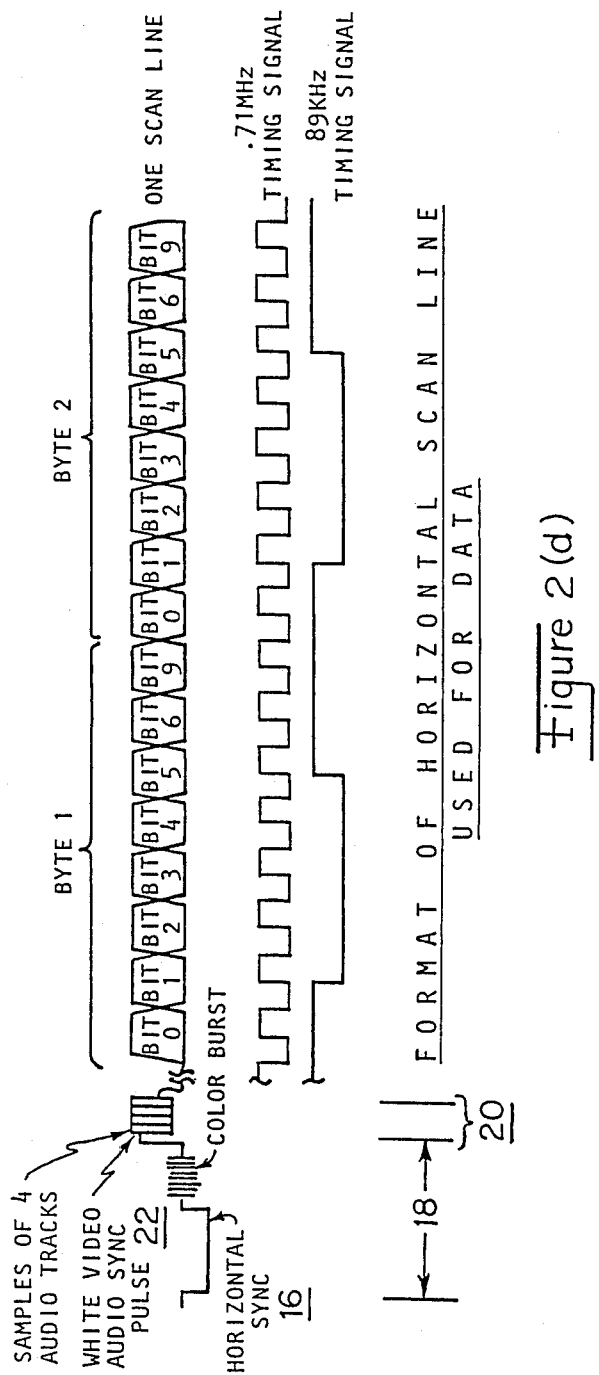

VIDEO SYSTEM, METHOD AND APPARATUS

RELATED APPLICATION

This application discloses subject matter similar to the subject matter disclosed in pending application for U.S. Pat. Ser. No. 016,670, entitled "Interleaved Video System, Method, and Apparatus", filed Feb. 19, 1987, by John D. Perkins.

BACKGROUND OF THE INVENTION

Field of the Invention

This invention relates to the system, method and apparatus for displaying selectable ones of multiple television fields that are simultaneously accessible from an interleaved composite video signal, and more particularly to the techniques for interactive display of selectable television program materials that include the images of real people, objects and places or animated images, or combinations thereof.

Certain known forms of processing of television signals permit selective switching between one sequence of images, or 'program', and another sequence of images, or another program, for example, in connection with video games that display a composite real-image background and animated foreground. Selection of one program, or another program for such background displays is conventionally provided by separate tracks of limited length that are pre-recorded, for example, on a video disk. In systems of this type, the background video 'program' may be selectively changed to suit the foreground image (which may be independently generated by computer) by switching between program tracks on the prerecorded video disk.

In other known television schemes, alternate program information may be transmitted on another, non-standard carrier signal, or may be time-shared on a standard carrier signal to constitute split-image display of information. Schemes of this type are described in the literature (see, for example, U.S. Pat. Nos. 2,681,383; 4,266,240; 4,287,528; 4,393,404; 4,467,356; 4,484,328; 4,510,520; and 4,593,318).

These known schemes are not readily conducive to real-time video displays of continuously selectable program materials of the type, for example, that may be transmitted over cable television networks. Nor may these known schemes be usable for transmitting multiple, real-time programs over a single television channel simultaneously for final selection, editing, and interaction therewith by the viewer.

SUMMARY OF THE INVENTION

Accordingly, it is an object of the present invention to provide the system, apparatus and method for interleaving multiple, simultaneous television programs for final selection, editing, and interaction therewith by the viewer. In accordance with the preferred embodiment of the present invention, this and other objectives are accomplished by iteratively interleaving successive fields of different video program materials to form a composite signal for selectable display and reproduction (where a standard video frame comprises two interleaved video fields).

The successive fields of the selected program material are processed to form a video signal that is configured within the NTSC standards for viewing on conventional television receivers. The signal processing includes a field buffer or storage medium to provide requisite signal information for continuous display of at least one field of the selected program material until updated by a successive field of the selected program material. In this manner, a continuous visual display is formed as a series of rapidly-changing fixed fields of video information. The selection of alternate program material is accomplished by successively updating fixed fields of the alternate program material using the successive fields of the selected alternate program material contained in the composite video signal. Additional information including audio signals, voice, data, and the like, may be included with each successive video field of the multi-program materials separately from the conventional NTSC audio information.

The selection of the program material to be displayed may thus be controlled directly by the viewer for television or telemetry displays, or controlled through an interactive logical control sequence for video games or tutorial programs. The succession of choices of alternate program materials may be stored to recreate the viewer's 'edited' version of the composite video signal. Several selectable programs may be prepared for transmission simultaneously, for example, via cable television for the viewer's selection in real time. In this manner, several sponsors may share the same time slots and pay proportionately less for advertising associated with the multi-programs that reach the viewers more selectively.

DESCRIPTION OF THE DRAWINGS

FIG. 2(d) is a graphic representation of a horizontal scan line used for transmitting data and audio within the video field;

DESCRIPTION OF THE PREFERRED EMBODIMENT

Figure 1A:
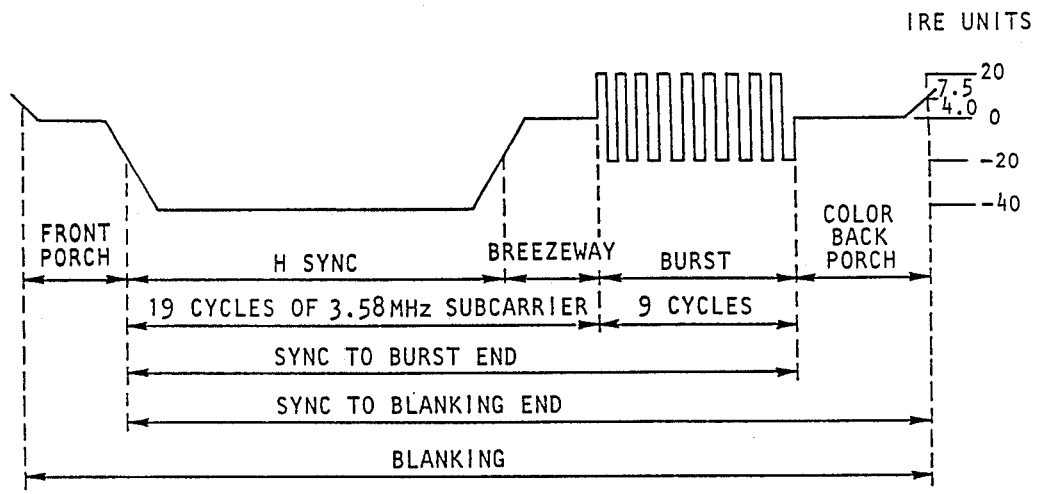
FIG. 1(a) is a pictoral representation of a conventional television signal within the blanking interval.
Figure 1B:
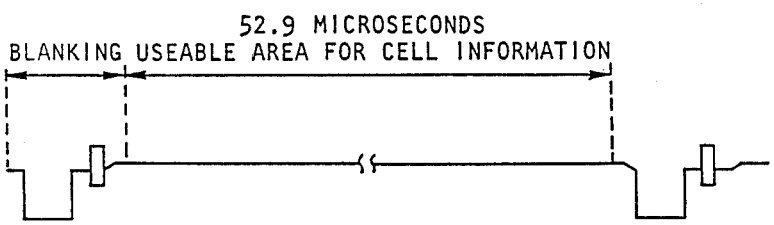
FIG. 1(b) is a simplified graphic representation of a composite scan line of a television signal.

Referring now to FIG. 1(a), there is shown a portion of a conventional television signal within the blanking interval for horizontal retrace of the position of the electron beam in a cathode-ray display tube. The basic data cell according to the present invention is the equivalent of one horizontal scan line or trace of an RS-170A composite video signal, as shown in FIG. 1(b). There may be several types of data involved in a data cell in the invention including analog and audio data, several bits of serial digital data, analog video information with color modulation at 3.58 Mhz., and may include a mix of these types of information on horizontal scan lines within vertical blanking and non-vertical blanking portions of a video field.

A logical accumulation of data cells constitutes a video field that contains 262.5 horizontal scan lines or traces of information sufficient for producing a displayable field on the cathode-ray display tube of a television receiver. The first horizontal scan lines or traces 1 through 9 are reserved for vertical synchronization in conventional television signals, and lines 257 through 262 usually suffer degradations from skewed tape-recording servos, noise caused by switching of tape-recorder heads, and the like. The remaining intermediate 248 horizontal scan lines that form the central region of a displayable field (and, optionally, all horizontal scan lines) are available to include digital and audio signal information according to this invention in a manner which is compatible with existing NTSC requirements for horizontal line placement within the displayable field.

Figure 2A:
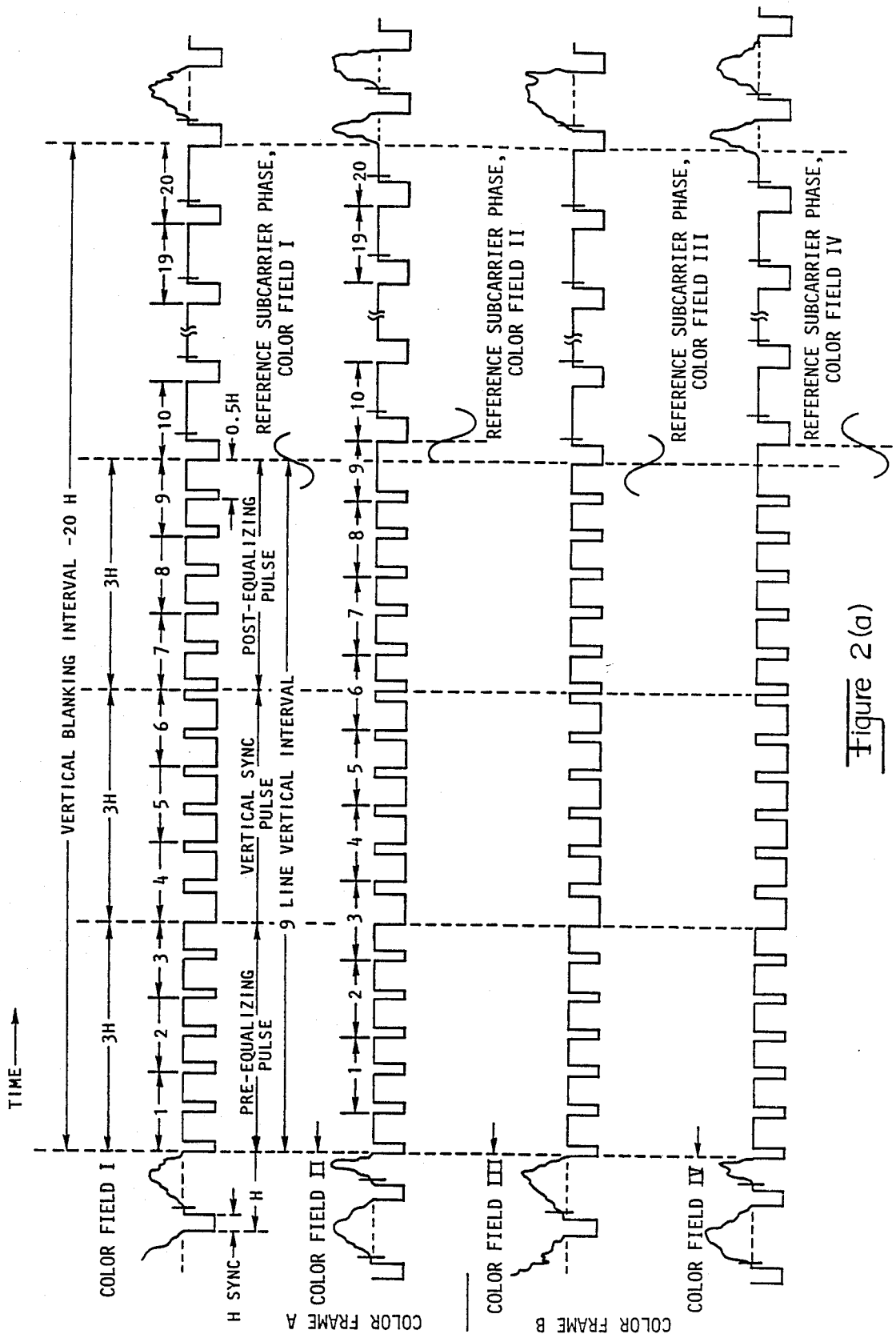
FIG. 2(a) is a graph showing several partial television waveforms in accordance with NTSC standards.

Referring to FIG. 2(a) there is shown a graph of several conventional television waveforms within the vertical blanking interval. Color fields I and II are associated with color Frame A, and color fields III and IV are associated with color frame B. Of course, such signal waveforms continue through this sequence of 262.5 conventional scan lines or traces, as illustrated in FIG. 2(b).

Figure 2B:
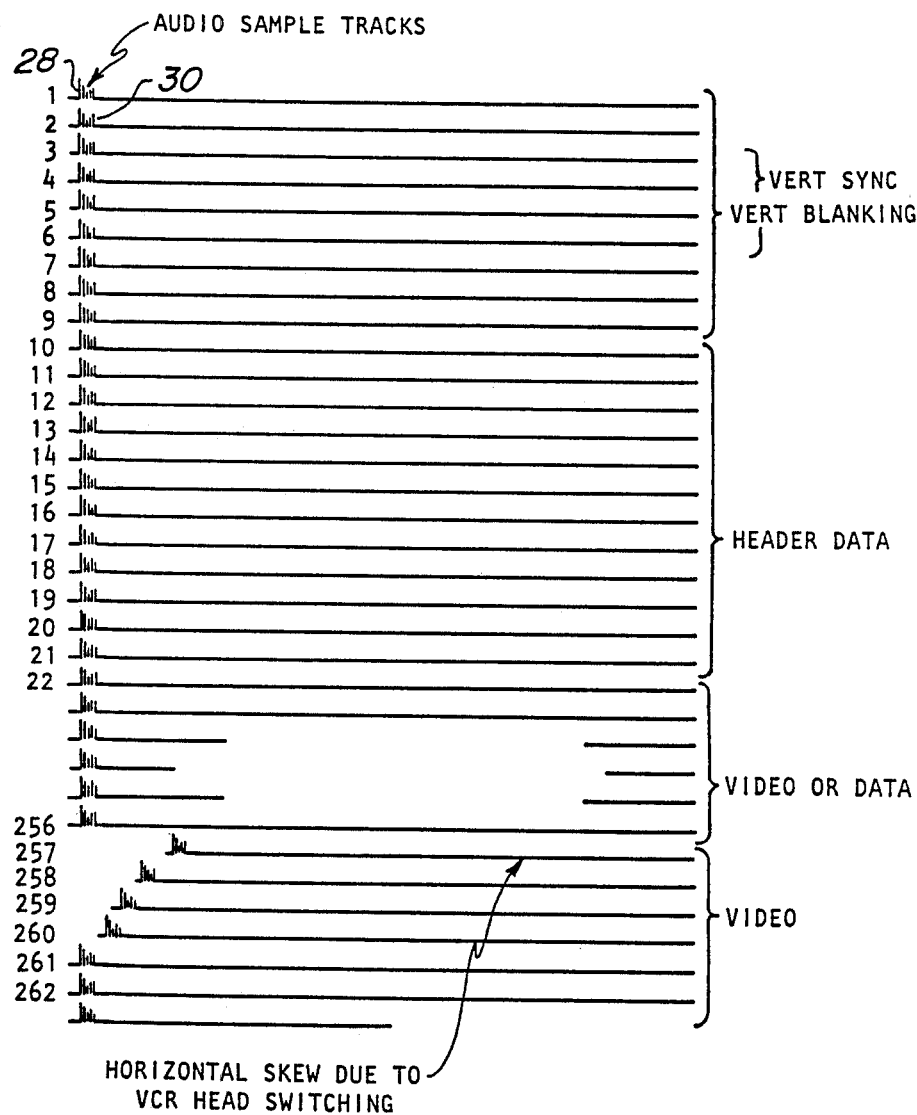
FIG. 2(b) is a graph illustrating the horizontal scan lines of a television video field including audio signal information according to one embodiment of the present invention.

In addition to the conventional field of horizontal trace information for displaying one video field, the present invention introduces audio information on all horizontal scans or traces of a video field in the one embodiment illustrated in FIG. 2(b) (or as compressed audio information on only a selected few horizontal scans or traces such as lines 10 and 11 in another embodiment).

Figure 2C:
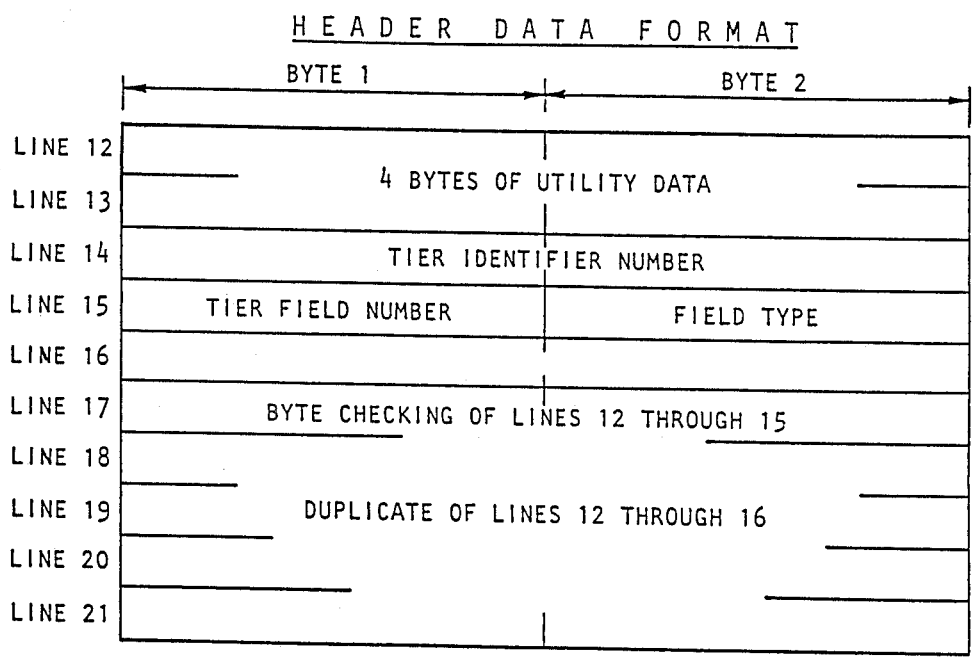
FIG. 2(c) is a graphic representation of header and other data included in video fields according to the present invention.

FIG. 2(b) shows how a standard NTSC video field is modified in accordance with the present invention. In accordance with NTSC standards a video field contains 262½ scan lines. In one embodiment of the present invention, the beginning of each and every scan line contains an audio sync pulse 28 followed by a variable number of audio sample tracks 30. Note that where VCR head switching occurs, which is normally at line 257 in the video field, there is a horizontal skew that occurs. The purpose of the audio sync pulse is to locate the audio samples even during the period when the horizontal lines are skewed. In the video field, lines 1 through 3 and lines 7 through 9 contain equalizing pulses, and the vertical sync pulse occurs during lines 4 through 6. Lines 12 through 21 contain header data, as illustrated in FIG. 2(c), which indicates the position of this field in a logical sequence of fields. The header data is also relevant to the program material, including the spacing of successive fields of the same program material. Additional data may be included in lines 22 through 256 in lieu of normal video.

FIG. 2(c) illustrates the format for header data. Each line contains two 8-bit bytes or one 16-bit word. Lines 12 and 13 contain 4 bytes or two words of utility data which can be used to control program flow, synchronized with the current program material. Line 14 is a tier identifier number that indicates which tier or program material this field is a member of. The first byte of line 15 contains a tier field number. This is a sequential number beginning with 0 for the first field of a new tier or portion of program material. A value of 255 indicates the end of this tier or program material. The second byte of line 15 contains a field type identifier. Field type has 256 possibilities and indicates the format of video versus digital data contained within this field. A type of 0 indicates that lines 22 through 262 contain video information only. Other values indicate the type and location of digital data within the normal video period of lines 22 through 256. For example, a value of 1 may indicate that lines 22 through 256 contain digital data in the form of program header. A value of 2 may indicate that lines 2-256 contain digital data (not for display) which represents program logic. Line 16 contains the byte check sum of lines 12 through 15. Lines 17 through 21 inclusively, may contain a duplicate of lines 12 through 16.

FIG. 2(d) shows the format of a horizontal scan line used for digital data. As with a conventional NTSC signal, a typical horizontal scan line begins with the horizontal sync pulse, a colorburst and then, according to the present invention, an audio sync pulse followed by samples of audio tracks (in this case, four shown). At a point in the video area which is approximately 20 microseconds past the leading edge of the horizontal sync pulse, a stream of 16 databits occurs. The width of each bit is approximately 1.4 microseconds. The value of 0 is indicated by a video level below the 40% mark of black to white video, and the value of 1 is indicated by a level greater than 60% of the range between black and white. The 0.71 megahertz timing signal and the 89 kilohertz timing signal are both referenced to the leading edge of the horizontal sync pulse and are used to show the relative position of the databits with respect to these timing signals.

Figure 3A:
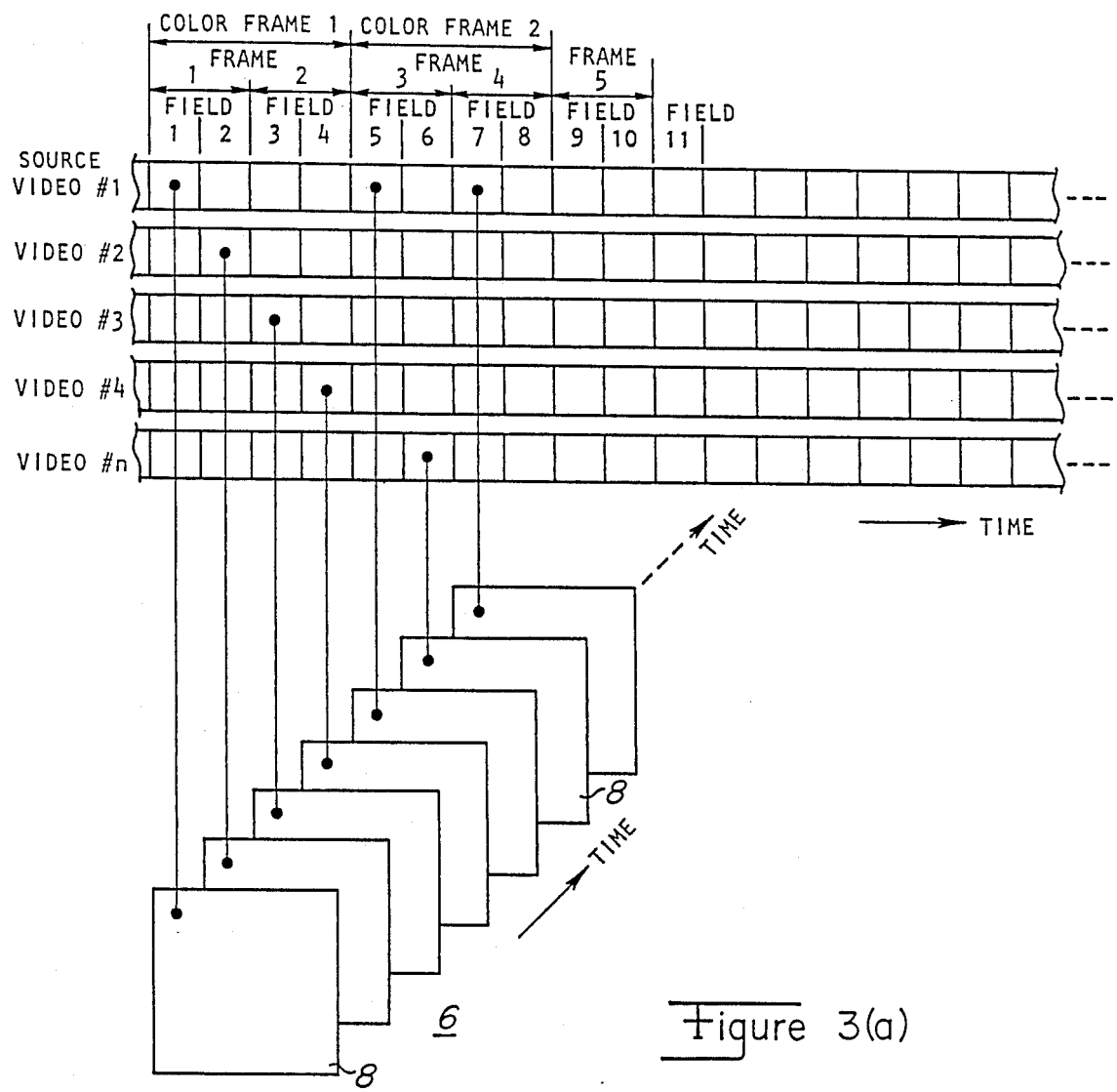
FIG. 3(a) is a pictorial, graphic representation of interleaved video fields according to the present invention.

FIG. 3(a) illustrates the scheme by which video material from several sources are combined and interleaved to form a video signal compatible with the present invention. In the example shown, field 1 of frame 1 of colorframe 1 is presented as the first field. Field 2 is selected from field 2 of frame 1 of colorframe 1 of video source 2. Continuing with the example shown, field 3 of video source number 3 is selected for the third field. Field 4 of video source number 4 is selected from the fourth field. The fifth field is selected from field 5 of video source number 1. Field 6 is selected from video source N, and field 7 is selected from video source 1. The order in which video sources contribute to the resultant stream of video fields may be fixed or variable according to the present invention. It should be noted, however, that each field in the resultant stream of video fields corresponds to the like numbered field of the tier or program source from which the video field is selected.

Referring now to FIG. 3(a), there is shown a pictorial illustration of video signals #1 through #N of displayable programs assembled into a selected sequence of video fields 6. Each of the video signals #1 through #N may be referred to for convenience as a 'tier' and, as illustrated in FIG. 3(a), the selected video fields of the tiers (whether color, or black-and-white, or non-displayable data) are assembled in a sequence to form the composite multi-program (or multi-tier) video signal 6, according to the present invention. Specifically, if the sequence of video fields in video signal 1 is associated with scene 1 (e.g. camera 1 providing one camera angle), then that tier 1 is of scene 1. Similarly, tiers 2, 3, n provide scenes 2, 3, n, respectively.

In accordance with the present invention, the video fields of tier 1 are alternated in sequence with the video fields of tier 2 (and tier 3 and tier n) to produce the resulting composite signal 6, as illustrated in FIG. 3(a). The sequence of video fields selected from the tiers #1 through #N may be cyclic or according to an arbitrary sequence. Each video field associated with a tier may correlate with the next video field in the sequence of that tier, so that the related video fields may be re-assembled during play-back and display according to the present invention as continuous portions of arbitrary length or duration of the initial tiers, as illustrated pictorially in FIG. 3(b).

In order to assure that video fields associated with a given tier may be properly correlated, each video field 8 includes header or identification information, which as previously descirbed, starts at line 10 and continues to line 21, for example in the following sequence:

lines 10 and 11—Compressed Audio Cell (in one embodiment);
lines 12 and 13—Four bytes of utility streamer data;
line 14—Tier identifier number
line 15—Tier field number and field type
line 16—Checksum for lines 12–15
lines 17–21—May duplicate lines 12 through 16.

Figure 3B:
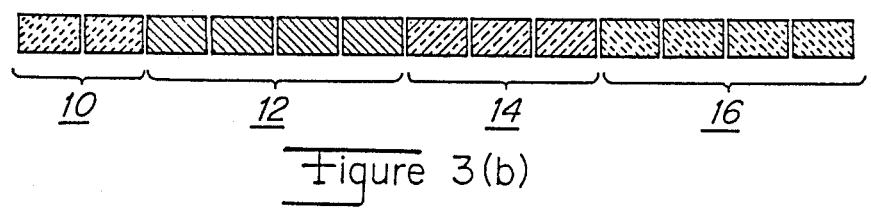
FIG. 3(b) is a graphic representation of video fields re-assembled according to viewer selection from the sequence of interleaved video fields.

The tier identifier number identifies each of the initial tiers of displayable program material (up to 65,535), and the tier field number designates the field sequence in the designated tier, as illustrated in FIG. 3(a). The video field type identification identifies a normal video field from a digital video field, as previously described, since a digital video field will normally not be displayed. With the header information in place, the transfer rate of streamer data is 240 bytes per second, or about 1900 BAUD. Each video field contains 2 bytes of data that indicate the tier number of which this field is a number to facilitate the skipping from field to successive field in a non-cyclic sequence for re-assembling the correlated, sequential video fields of a selectable tier, as illustrated in FIG. 3(b), according to the present invention. The interleave factor between video fields identifies the distance (or interleaved number of video fields) between correlated video fields of the same tier and can be arbitrarily changed at any video field according to the needs of the current program material. Of course, if the composite video signal 6 includes successive fields cyclically assembled from the tiers #1 through #N, then simple iterative counting may be used to re-assemble successive fields of a selected tier without the need for header information. Frequent, non-cyclic selections of one tier over another tier, however, may be required to improve the visual display of rapid image movements in such one tier of program material, compared with slower image movements (for example, a scoreboard) in another tier of program material. The typical tier of program material is a displayable video scene of moving objects. In order to maintain reasonably acceptable display of motion, it is believed that compilation of four tiers of program material is a subjective limit, although many more tiers are possible according to the present invention. In addition to typical tiers of displayable program material, the present invention also accommodates data tiers which can transfer digital data (normally not for display but for control or other purposes) at the rate of approximately 28K bytes per second. The composite video signal 6, as illustrated in FIG. 3(a), may therefore be selectably and interactively reassembled into portions 10, 12, 14, 16 of arbitrary duration of the original tiers of successive video fields, as illustrated in FIG. 3(b). Of course, the composite signal illustrated in FIG. 3(a) may occur in real time, for example, for cable transmission or be recorded on, for reproduction from, a recording medium such as conventional video disks or video cassette recording tape.

Figure 4:
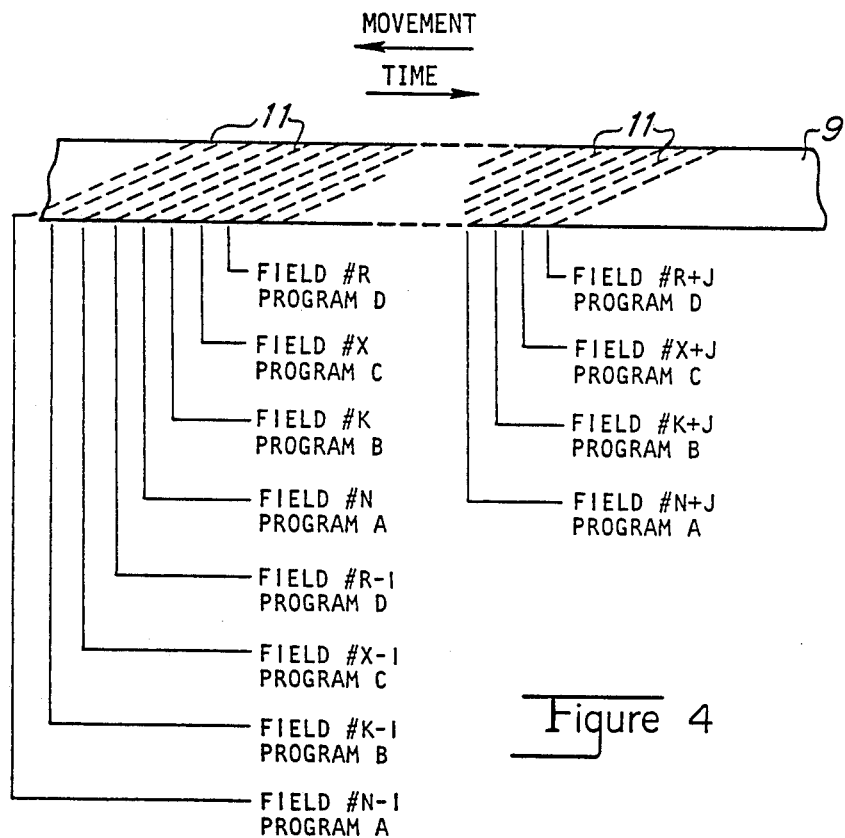
FIG. 4 is a pictorial representation of video field scan lines assembled on conventional video recording tape according to the present invention.

Referring now to FIG. 4, there is shown a pictorial representation of the composite signal for multi-program material compiled on video tape 9. All the image information for a single video field of color or black and white program material, including header and audio samples, as previously described, is contained in the trace 11 of one head scan that is oriented in skew relationship to the longitudinal dimension of the tape 9 for operation on conventional helical-scan video tape recorder equipment. The traces 11 include scan synchronizing information and field header information, as previously described, for proper operation of decoding equipment, later described herein. The video field traces are interleaved along the length of the tape (i.e. in 'time' in cyclic manner, as illustrated) such that the field (n) for program material A is followed by field (k) for program material B, followed by field (x) for program material C, followed by field (R) for program material D, followed by field (n+1) for program material A, followed by field (k+1) for program material B, and so on for the duration of the composite signal in time (or length of tape 9). Thus, one field of a selected program is followed by a successive field of information for the same program only in the fourth successive trace with fields of independent information for three other programs presented in the three intervening traces. The correlated video fields that comprise one complete program may therefore be reconstructed in accordance with one embodiment of the invention by using every fourth trace in the sequence, while each of the other complete programs may be reconstructed using every fourth trace displaced by one or two or three traces, respectively. Of course, it should be understood that there may be two or many dozens of individual programs assembled with successive traces of video field information for each program cyclically (or non-cyclically) interleaved to form a composite multi-program or multi-tier video signal in this manner.

As later described herein, the display image associated with each video field of information of a given program remains on display until updated by the next video field of information of the same program. Therefore, increasing the number of interleaved, individual programs increases the delays between updates, with concomitant appearance of jerky or stroboscopic movements of displayed video images. In accordance with one embodiment of the present invention, program materials including rapidly moving images may include higher density of successive fields of information (i.e. greater number of fields per unit time) in non-cyclical distribution in the composite signal to reduce the delay time between updates of fixed-field displays to thereby reduce the jerky or stroboscopic appearance of moving images being displayed. Of course, it should also be understood that such composite signal need not be assembled on a video tape, as illustrated in FIG. 4, but may be assembled and transmitted in real time, for example, via cable television network, with successive fields of multiple programs interleaved in cyclic or non-cyclic succession, as previously described.

In accordance with one embodiment of the present invention, each video field of information includes the header data or coded signals previously described to designate the correlated or associated program material and the field number in the succession of video fields for that program. In addition, each video field includes audio signal that are introduced into the horizontal scans or traces of each video field in various ways according to alterative embodiments of the present invention. In one embodiment, as illustrated in FIG. 2(d), the initial portion of the video waveform that follows the horizontal synchronizing pulse 16 by a selected time interval 18 includes four distinct timed intervals 20 (for four tracks of audio programs) preceded by an audio synchronizing pulse 22. In each of the four timed intervals occurring in the interval 20 that follows the audio sync pulse 22, individual samples of analog audio signals for each audio signal channel are imposed on the video intensity level at the start of the horizontal scan or trace. Since this initial sector of the horizontal trace is normally not displayed, the audio signals imposed on the video intensity levels according to this embodiment of the present invention does not significantly alter compatibility with standard NTSC television waveforms. Such individual channels of audio signal samples occurring on each of 262 horizontal traces or scan lines per 1/60 of a second per video field, as illustrated in FIG. 2(b), yields approximately 7.8 KHZ of audio signal bandwidth in each audio signal channel. A greater number than four independent audio channels (for a greater number than four tracks of audio programs) tends to extend the audio-samples interval 20 into visible, displayable portions of horizontal traces 22 through 256, and may therefore require masking to prevent their appearance on the television display screen.

In accordance with another embodiment of the present invention, audio signal information may be selectively introduced into the horizontal traces of a video field by allocating, say, horizontal scan or trace lines 10 and 11 for compressed audio signalling. In this embodiment, the individual channels of audio information are compressed into the video interval of horizontal trace line 10, or line 11, or both, as illustrated in FIG. 1(b), for high-speed transfer into a buffer register. Then, the buffer register can be clocked at low speed to yield the slow-speed stream of audio signal samples over the time interval until horizontal scan line 10 next appears in the next video field. Audio signals introduced into video fields of displayable programs remain compatible with standard NTSC television waveforms, and additional audio channels can be readily introduced with higher speed transfers of audio samples into buffer registers, or with additional horizontal scan lines allocated for compressed audio signalling.

In each of the embodiments described above for introducing audio signal information into the video field information, it should be noted that audio information correlated with all tiers of displayable programs is included in each video field of each tier. In this manner, the on-going audio signal information correlated with any one tier is always available from the video fields of such one or other tiers, even though the video fields for such one tier may be infrequently sampled (for example, to display a scoreboard with continuing background music).

Figure 5:
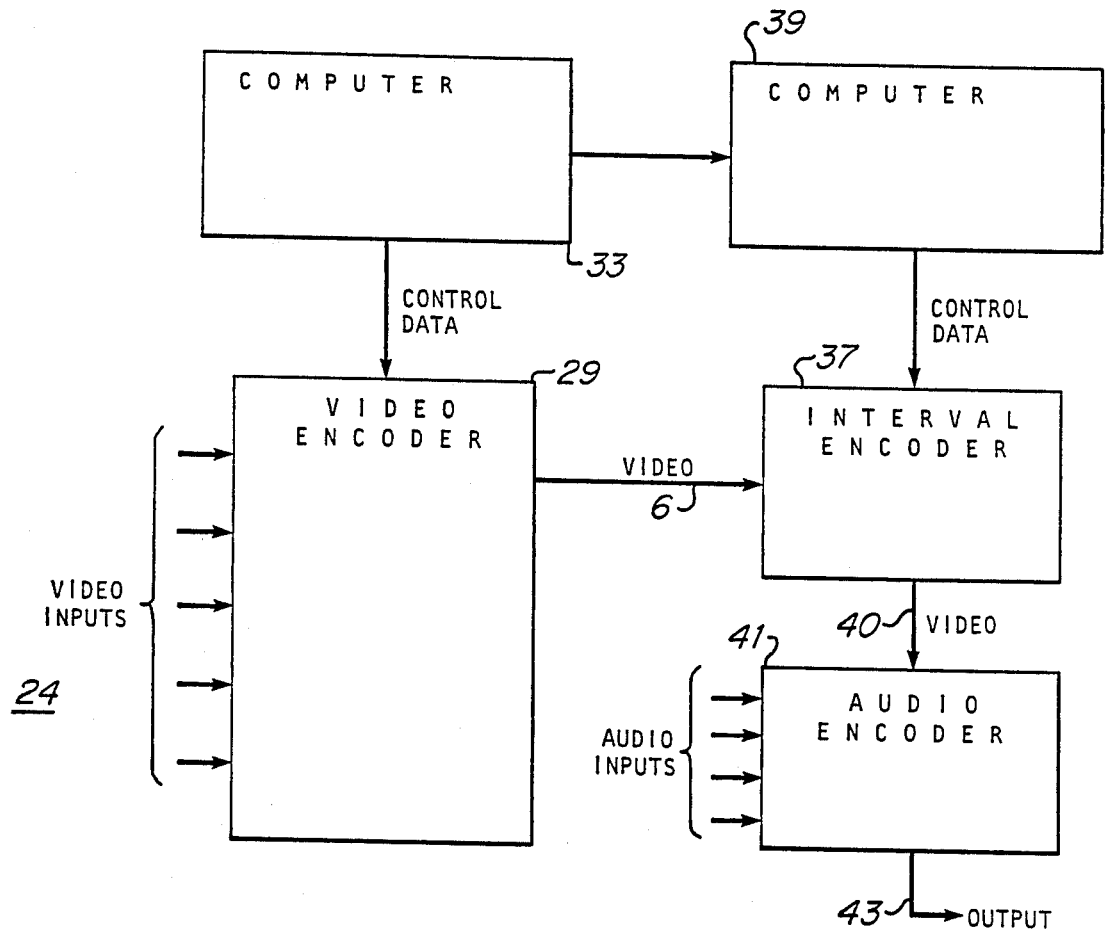
FIG. 5 is a general block schematic diagram of circuitry for producing interleaved, multi-program video fields according to the present invention.
Figure 6:
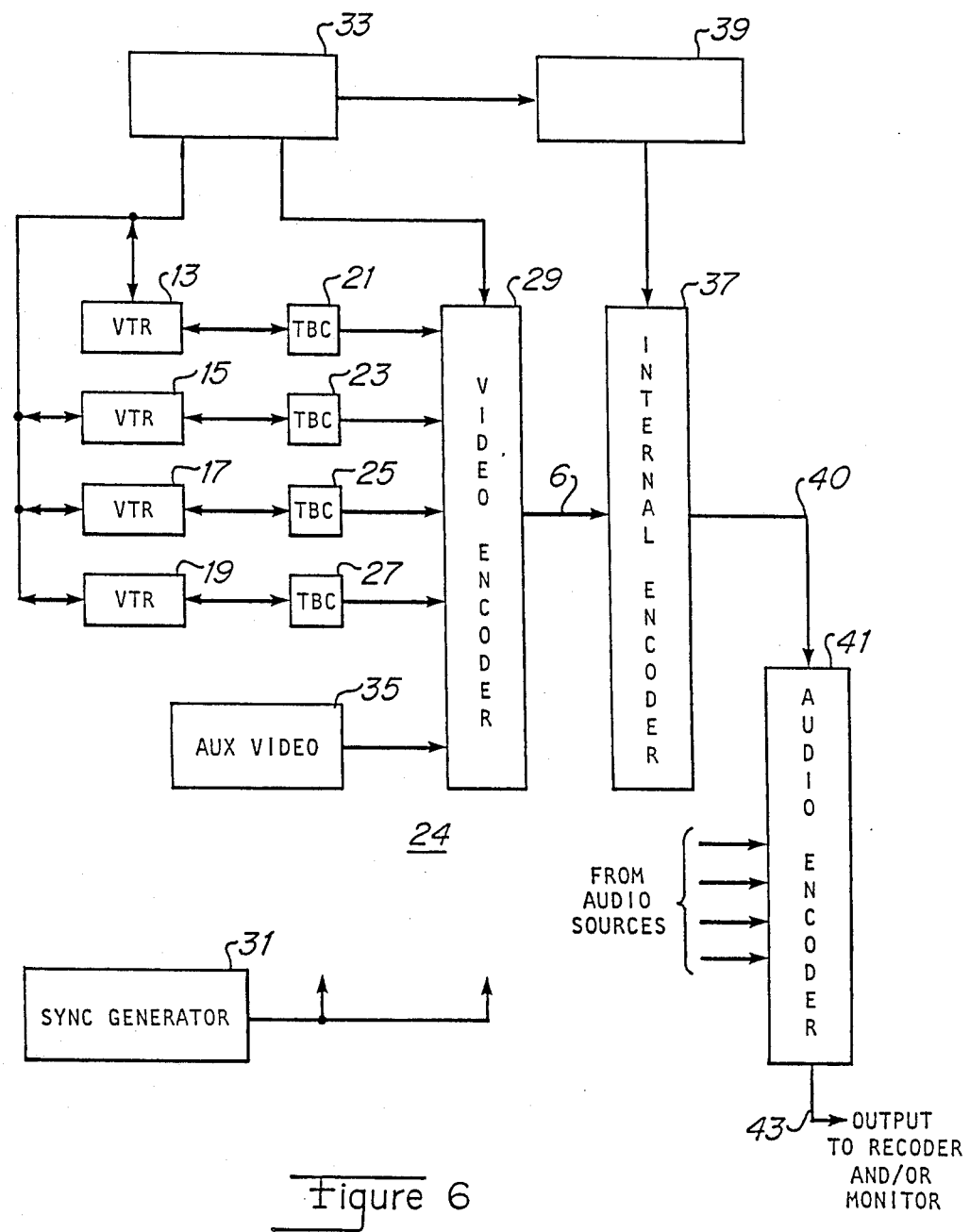
FIG. 6 is a block schematic diagram of the encoding system according to the present invention.

Referring now to FIGS. 5 and 6 there are shown simplified block schematic diagrams of apparatus according to one embodiment for producing the composite video field signal 6 for multi-tier or multi-program interactive operation on multiple video inputs 24.

In FIG. 6, the video inputs 24 are illustrated to be derived from multiple sources 13, 15, 17, 19 of program material (such as video tape recorders or video cameras). Each source is connected via conventional time-base correctors 21, 23, 25, and 27 to a video encoder 29 which produces the composite video signal 6 by interleaving the selected video fields from the multiple program sources. The interval encoder 37 generally introduces header data on the composite video signal under control of a computer or processor 39, and the audio encoder 41 that follows generally introduces audio information correlated with the multiple programs into the video field output information 43.

Specifically, with reference to FIG. 6, the multiple program sources 13-19 (e.g. video tape recorders or video cameras) in association with the synchronization generator 31 assure that the program sources 13-19 operate in synchronism to provide individual video field inputs 24 from the multiple program sources 13-19 that are synchronized in time, as illustrated in FIG. 3(a). Auxiliary video information 35, for example, background scenery that is normally intended to be updated only over long intervals, or filler scenes for display during transitions between program sources, may also be supplied to the video encoder 29.

Figure 7:
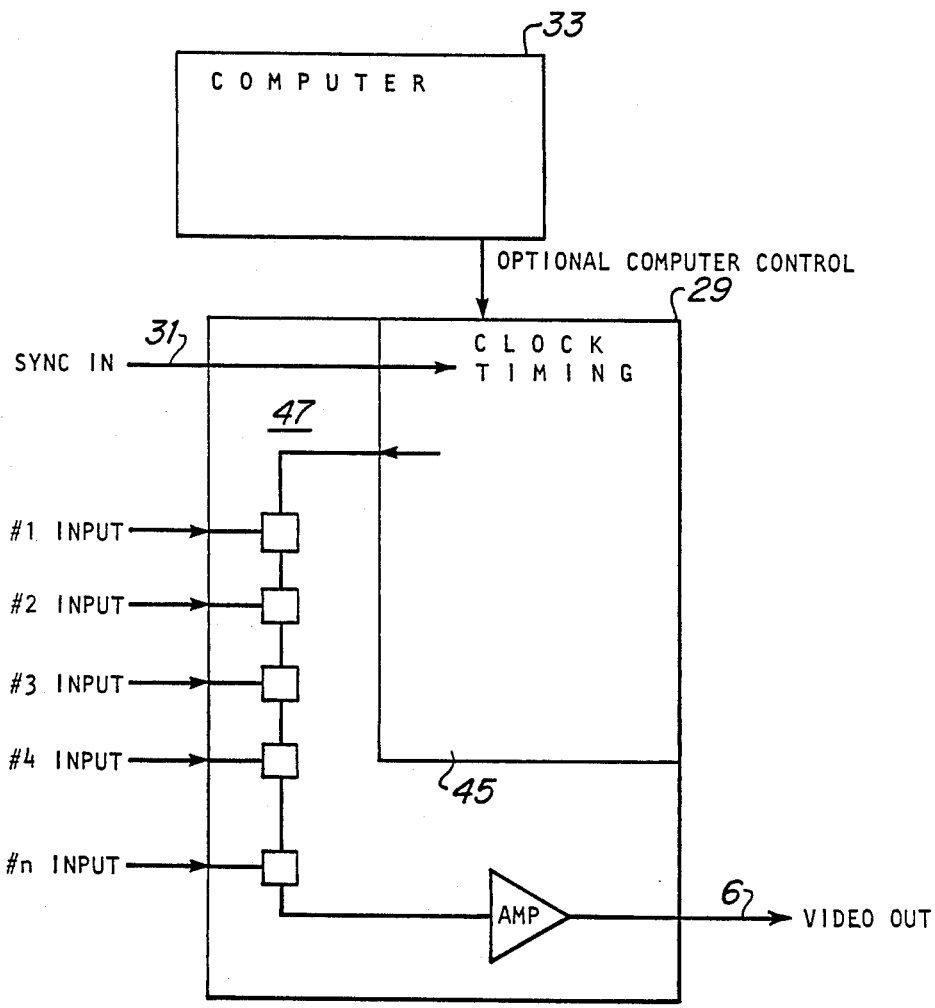
FIG. 7 is a block schematic diagram of the video encoder circuitry of the present invention.

A minicomputer or microprocessor 33 is connected to control the signal sources with respect to time codes (such as status and position information that are associated with the fields of taped program materials). The computer 33 thus controls the encoder 29 which may be a conventional video switch to select particular, successive fields of selected program sources in accordance with an edit decision list, later described herein, to produce a composite video signal 6, as previously described in connection with FIG. 3(a). The selection of particular video fields at the inputs 24 from the program sources 13-19 can be made at every video field by the computer 33 in accordance with this edit decision list (e.g. a look-up table in software) that follows the synchronized time line that is common to the program sources. With reference to the block schematic diagram of the video encoder 37 illustrated in FIG. 7, the exact timing for the switching is determined by the synchronizing clock 45 that received sync input from the synchronization generator 31, which, in turn, may derive its synchronization from the reference subcarrier information (i.e. standard SCH timing signals), as illustrated in FIG. 2(a). Thus, the video input gating or switching 47 under exact timing control of the clock 45 selects color field I from video source 1, color field II from video source 2, color field III from video source 3, color field IV from video source 4, and so on. Control by computer 33 may not be required in this cyclic example to achieve a succession of video fields in the composite video signal 6, but is required to achieve non-cyclic, dynamically-controllable succession of video fields selected in arbitrary sequence, as shown in FIG. 3(a), from the video inputs.

Figure 8:
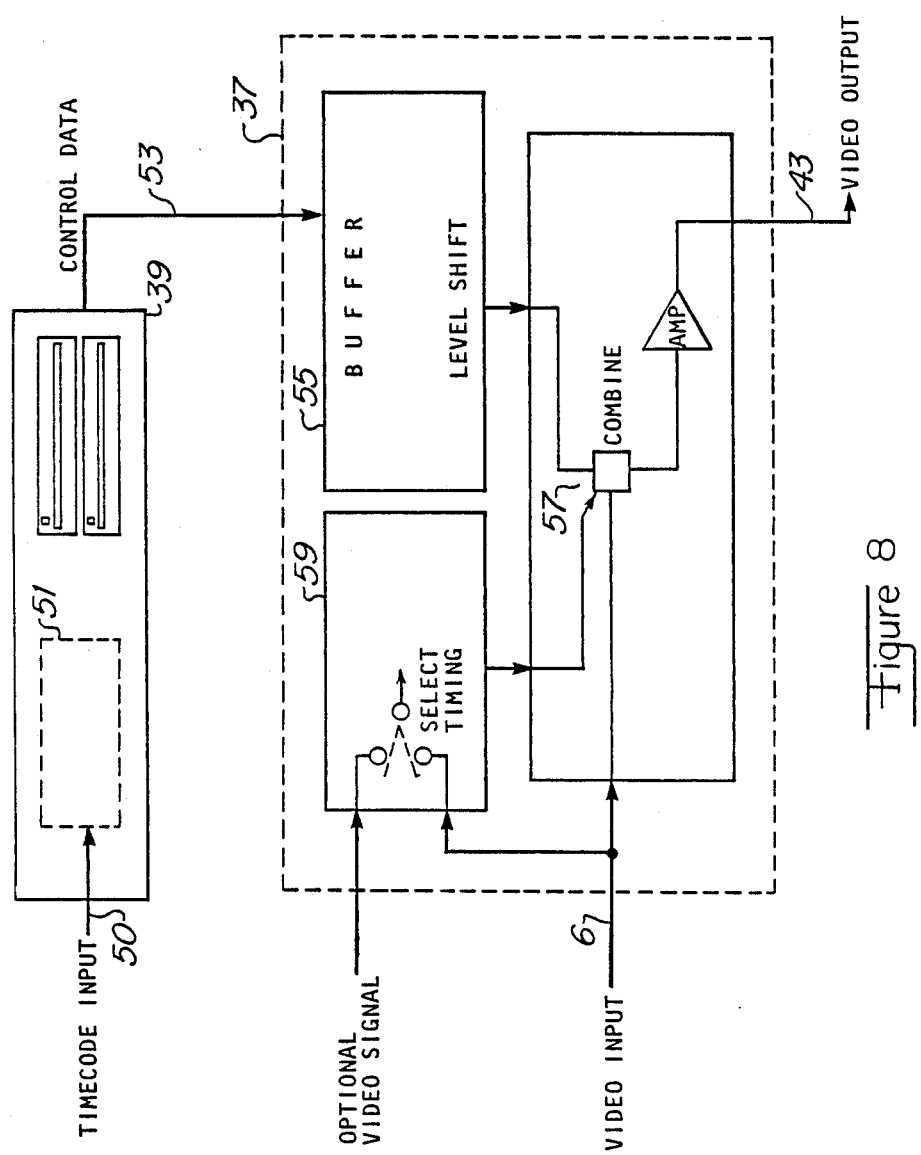
FIG. 8 is a block schematic diagram of the interval encoder circuitry of the present invention.

Referring now to FIG. 8, there is shown a block schematic diagram of an interval encoder 37 that is arranged to place all of the header and digital data in the correct locations in each video field in the composite video signal 6. The header data must be issued according to the timeline which is the standard SMPTE timecode input 50 to the time code reader 51. This time code input is derived from a master controller such as computer 33 or from a master tape recorder, or the like. Thus at every new video field, the computer 39 is activated by the time code reader to supply control data 53 to the level shifting buffer 55 of the interval encoder 37. This buffer 55 changes the signal levels to video-compatible levels and interposes the data 57 on the correct horizontal scan line or trace of the current video field. The timing for interposing the header and other digital data at proper video signal levels is under control of the timing generator 59 that supplies synchronizing pulses 61 derived from the current video field or, optionally, from an external timing signal in a manner similar to the operation of the video encoder previously described in connection with FIG. 7.

Figure 9:
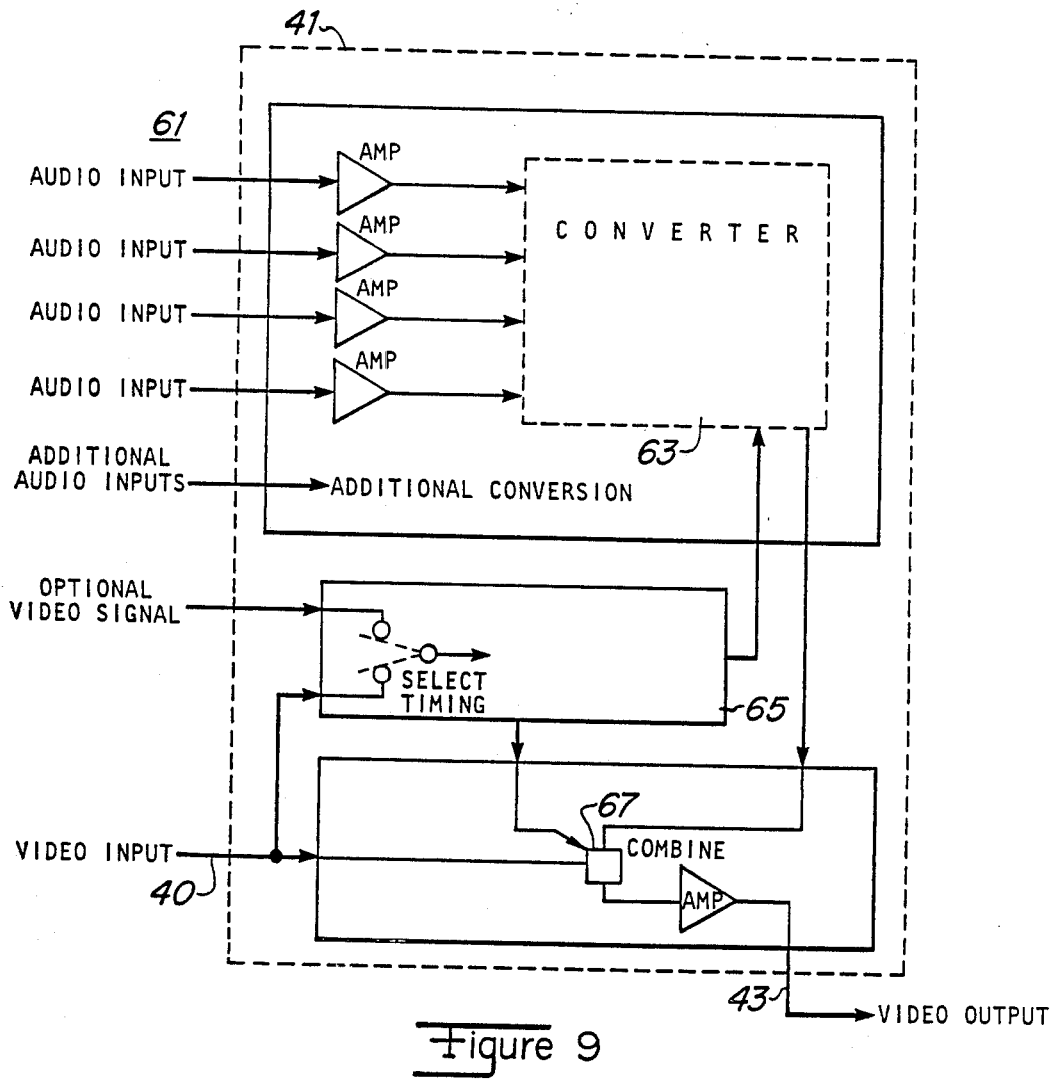
FIG. 9 is a block schematic diagram of the audio encoder circuitry of the present invention.

Referring now to FIG. 9, there is shown a block schematic diagram of the audio encoder 41 which is connected to receive the composite video signal (with header and digital data included) from the interval encoder 37. This encoder is similar in features and operation to the video and interval encoders previously described herein, and is configured generally to interpose the audio signal information in the current video field with the proper timing and signal levels. The audio encoder 41 accepts (N) number of audio signal inputs (which may be correlated with N number of tiers of displayable programs) for processing and placement in the current video field according to either embodiment of the invention previously described. Converter 63 thus receives the audio inputs and the video timing signals from the timing clock 65 (derived from the current video field or from an external timing source) to supply the requisite audio signal information for the current video field. In the one embodiment of the present invention in which channels of audio signal samples sequentially follow the horizontal sync pulse, as previously described with reference to FIGS. 2(b) and 2(d), the converter 63 is configured in conventional manner to supply an audio sync pulse 22 followed by a sample pulse per individual audio signal channel for interposing 67 on substantially each of 262 horizontal scan lines of the current video field.

In the alternate embodiment of the present invention in which compressed audio signal data is included on a specific horizontal scan line, as previously described with reference to FIG. 1(b), the converter 63 is configured in conventional manner to sample and compress approximately 1/60 of a second of audio signal information from each audio input 61 for interposing 67 on, say, the tenth horizontal scan line, or other line or lines, of each video field in the video input 40 an assembled, high-speed stream of compressed audio samples, as later described herein.

As thus described herein, the present invention produces a composite video signal which includes a sequence of video fields assembled by cyclic or non-cyclic selection of selected, successive fields of multiple displayable programs. Header and other data and audio signal information are interposed on the video fields to provide program and field designations useful in detecting and re-assembling successive video fields, with associated audio signals, that are correlated with a selected displayable program. However, it should be noted that while certain classes of real-time programming (e.g. multiple camera angles of the same sports event) may not require editing or pre-selection, classes of displayable program material such as tutorial or game-oriented products may require editing or pre-selection functions in order to assemble an optimal, interactive displayable product. In this latter class of products, there may be a need to play multiple program sources simultaneously in synchronism, and to select certain sequences for encoding and decoding, as later described herein, to develop a subjectively acceptable sequence of scenes of arbitrary durations selected from the multiple number of program sources. In addition, for tutorial or game-oriented products, certain video field sequences may have to be locked out from subsequent selection by an interactive viewer. A listing of acceptable and locked-out sequences is thus compiled into the edit decision list, previously described, with imposes limitations upon the sequencing of video fields from multiple tiers of displayable programs that is controlled by computer 33.

With the video fields selected, the interactiveness of the interval codes is reviewed by decoding and viewing the results subjectively. An edit control list is compiled of the sequences that are correctly workable in acceptable sequences, and such edit control list forms the basis for a look-up table that resides in the computer 39 to impose limitations upon the interval coding that may be introduced into each designated program and video field designation. The audio signals which correlate with the multi-tier programs can be stored on separate tape tracks for synchronized introduction into the edited version of a master tape of the selectable video fields, and normal audio signals may also then be recorded on the master tape in accordance with NTSC and RS-170 standards for television signals.

Specifically, then, some displayable program material will be edited in the present invention in the manner similar to conventional video production. In addition, editing program material according to the present invention may require displaying the sequence of interleaved video fields with and without interval-encoded interactions. The header data including interval codes thus provide the code information for the interactive recovery of the original tier information along a timeline. Thus, a master tape that stores a multi-tier, interleaved composite signal of video fields will begin with a standard timecode (by Hours: Minutes: Seconds:

Frames), and will continue with successive timecodes representative of every change in pattern or data, as illustrated in the following example:

| | |
|---|---|
| 00: 00: 00: 00-00: 01: 00: 00 = | normal blackburst signal; |
| 00: 01: 00: 01-00: 01: 01: 00 = | Color logo be held for 1 minute; |
| 00: 01: 02: 00-00: 02: 00: 00 = | copy protection and main data; |
| 00: 02: 00: 01-**: **: **: ** = | tutorial or game program; |

The duration of every timecode associated with a change in pattern or data may be stored in a database, down to the smallest duration (i.e. one field). Thus, the preceding examples identify four events by their start timecode numbers and their ending timecode numbers, listing the changes with descriptions of the events.

It should be noted that the timecode may be used effectively for controlling operation of multi-tier interleaved program material. For example, the timecode for blackburst signal has no header data, and a decoder unit that is arranged to receive the program material will normally wait for a valid header. A selected first display screen may thus have a header that designates a logo as tier zero (0) which the playback decoder will hold or freeze on display while digital data in successive video fields (not for display) in the form of executable object code may be downloaded to a decoder. The initial transfer or downloading of data may include an initialization routine for the decoder. Second and subsequent transfers may be of data and programs to determine how designated tiers and fields throughout the program may interact.

Figure 10A:
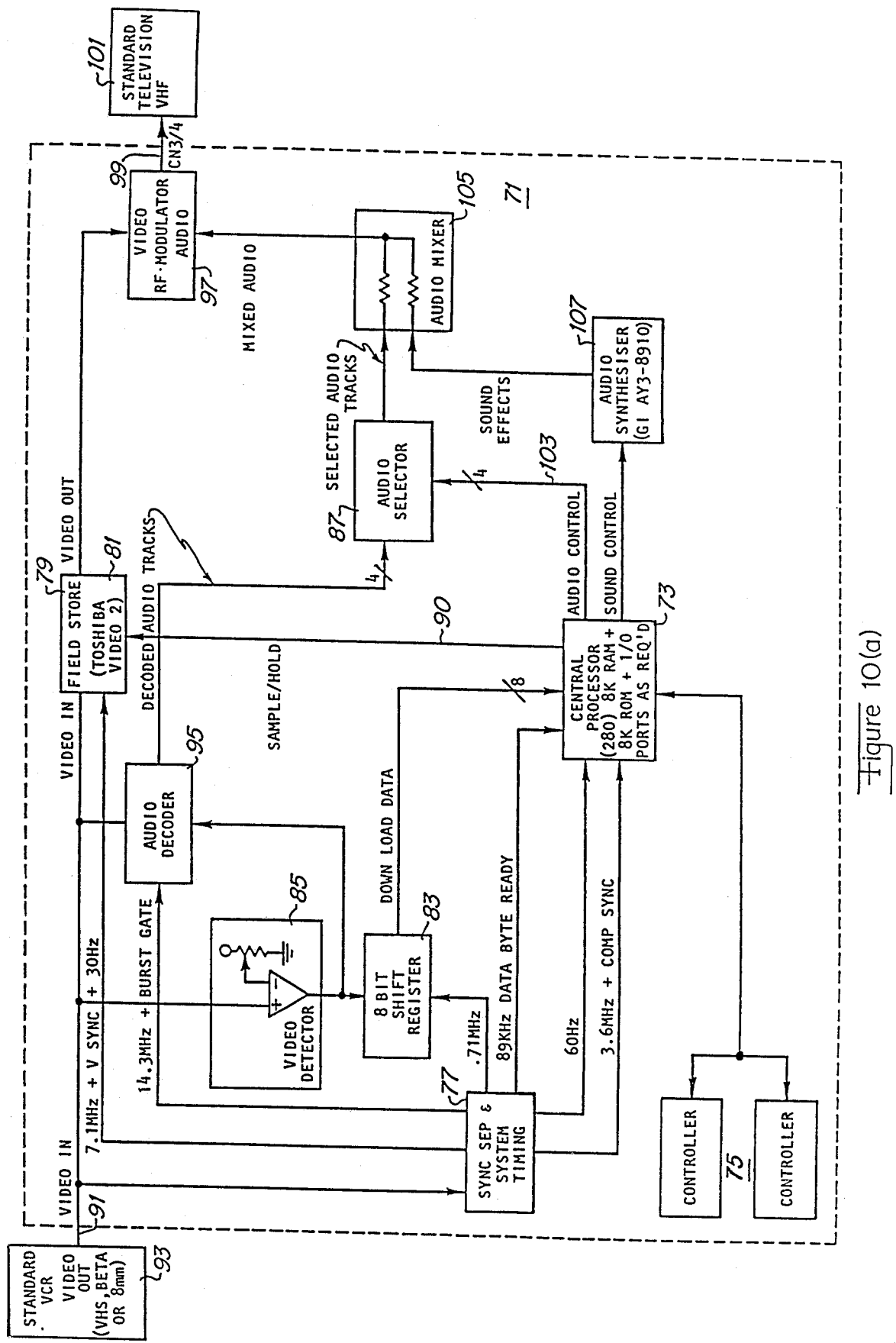
FIG. 10(a) is a general block schematic diagram of the interleaved video field decoding system of the present invention.

Referring now to FIG. 10(a), there is shown a block schematic diagram of one embodiment of decoder or playback apparatus 71 according to the present invention. Central processor 73 is connected to controllers 73 and to sync separator and system timing device 79, and to field store 81 and to the 8-bit shift register 83 at the output of video detector 85, and to the audio selector 87, and to the audio synthesizer 89. The central processor 73 is a Z-80 microprocessor with 8 kilobytes of RAM and 8 kilobytes of ROM. It also has I/O ports sufficient to accept input from the controllers 75 and to control the audio selector 87 and the sample-and-hold line 90 for the field store 79, and to accept download data from the 8-bit shift register 83. Video 91 in the form of composite NTSC signals from a standard video cassette recorder 93 (either in VHS, or BETA, or 8 mm, or other format) enters the decoder apparatus 71 through a jack so provided. The incoming video signal 91 is simultaneously applied to the input of the field store 79, the audio decoder 95, the video detector 85 and the sync separator and system timing device 77. The field store 79 captures on a field-by-field basis the contents of video pictures that come off a VCR tape of the type described in connection with FIG. 4 and played through the VCR 93. Timing and control signals are provided to the field store 79 from the sync separator and timing system 77 in the form of 7.1 megahertz oscillations and vertical sync, and 30 hertz reference signals. Control is also provided from the central processor 73 to the field store 79 to control whether the field store shall currently sample a new video image or play back a previously sampled video image. The field store 79 thus operates in a sample mode or hold mode. In a sample mode it samples a new video signal, the timing of which is controlled by the 7.1 megahertz, and vertical sync and 30 hertz signals. In the hold mode, those same signals are used to play back a previously stored field at the same rate at which it was recorded.

The output of the field store 79 is applied to the video section of the RF modulator 97 which modulates the stored video field for reception on channel 3 or 4. This modulated signal 99 becomes input to a standard television set 101.

When the field store 79 operates in the hold mode, a previously-sampled field is played back from the field store through the RF modulator 97 and into the television set 101, and the input 91 to the field store 79 during the hold and playback mode are ignored.

The input 91 from the VCR 93 is also applied to the sync separator and system timing block 77 which breaks out the synchronizing signals of the composite video signal 91 and makes them available for operation within the decoder 71. Thus, the vertical sync signal is applied to the field store 79, and the burst gate (which is a synchronizing pulse timed from the video input) is applied to the audio decoder 95, and a 60 hertz input is applied to the central processor 73. The 60 hertz signal applied to the central processor 73 gives the central processor a timing mark to designate when new fields of video occur so that the processor can make the decision whether to sample a new field or continue to hold a previously sampled field. The central processor 73 also uses the 3.6 megahertz signal that comes from the system timing block 77 as the basic system clock for the Z80 processor. The central processor 73 also relies upon the composite synchronizing signal from the sync separator block 77 in order to synchronize with the beginning of each horizontal scan line in a field.

The central processor 73 coordinates and handles the downloading of digital program data that may be stored on the tape. Such data may be available at each horizontal scan line where digital data is present, and the composite sync provides an indication to the central processor 73 of the beginning of a scan line so that the central processor 73 can synchronize its download function.

The sync separator and timing system block 77 provides 14.3 megahertz and a burst gate signal to the audio decoder 95. The 14.3 megahertz is used for timing within the audio decoder in order to locate audio data that was previously encoded into the video portion of horizontal scan lines of various fields in a manner compatible with the NTSC signal standards. The burst gate signal is used to locate the beginning of each scan line which contains audio data. The sync separator and timing system block 77 provides an 89 kilohertz signal which acts as a data-byte-ready indicator to the central processor 73 for the downloading of data. This data byte ready signal indicates that 8 bits of downloadable data had been shifted into the shift register 83 and that a byte, or 8 bits of data, is now available to the central processor 73. The data is shifted into the shift register at the rate of 0.71 megahertz or 710 kilohertz, a signal which is also provided by the sync separator and system timing block 77. Thus, the video detector 85, which is basically a comparator, looks for a video level above a certain threshold value. Video above that threshold value is taken as a binary 1 and video below that level is taken as a binary 0. The video detector 85 thus makes a decision based upon the luminence level of the video signal at a particular point on the scan line whether there is a 0 or a 1 binary value at that location. That value is then shifted into the 8-bit shift register 83 at each 710 kilohertz sample point. When 8 bits have been shifted in, an indication is supplied to the central processor 73 from the sync separator and timing system timing block 77 to indicate that 8 bits have been shifted in, and that the central processor 73 should accept the 8 bits of data to allow the cycle to begin again. There are two bytes of data accepted during each horizontal scan line.

The audio decoder 95 decodes audio which has been encoded into the video portion of each horizontal scan line. Multiple samples from various audio tracks may be so encoded on each horizontal scan according to one embodiment of the invention, and the audio decoder 95 will decode up to 4 audio tracks placed side by side at intervals of the 3.58 megahertz signal. The 4 tracks so decoded by the audio decoder are then applied to the audio selector 87 and the control lines 103 thereto from the central processor 73 determine which particular combination of the 4 audio tracks is to be combined to form one composite audio track. The selected audio track is then fed into an audio mixer 105. The audio mixer combines the decoded audio track with the output of a sound-effects audio synthesizer 107 which is also under control of the central processor 73. The output of the sound-effects audio synthesizer 107 is mixed by the audio mixer with the combination of selected tracks to provide a mixed audio output which is then applied to the RF modulator 97 where (like the video) it is modulated up for reception on channels 3 or 4 as part of the RF signal 99 in the standard VHF television range of channels 3 or 4 for playback on a standard television set 101.

The controllers 75 represent a matrix of pushbuttons, including pushbuttons numbered 1-12, an action button and a freeze button. The controllers 75 encode the buttons in such a way that each button has a unique 4-bit binary code. These 4-bit binary codes are applied to the central processor 73 as operator inputs to control interaction with the displayable video fields. Of course, the particular sequence of video fields controlled by the operator using controllers 75 may also be recorded on a standard video tape recorder connected to receive the modulated video output 99 as a mode of preserving the individually-edited multi-tier program material.

All the schematic block circuits in FIG. 10(a) are of conventional design. For example, the field store circuit 79 is similar to the frame-freezing buffer circuit available in the commercial DX3 digital video cassette recorders produced by Toshiba Corporation, and the audio synthesizer 107 is a commercially available integrated circuit type AY3 8910 produced by General Instruments.

Figure 10B:
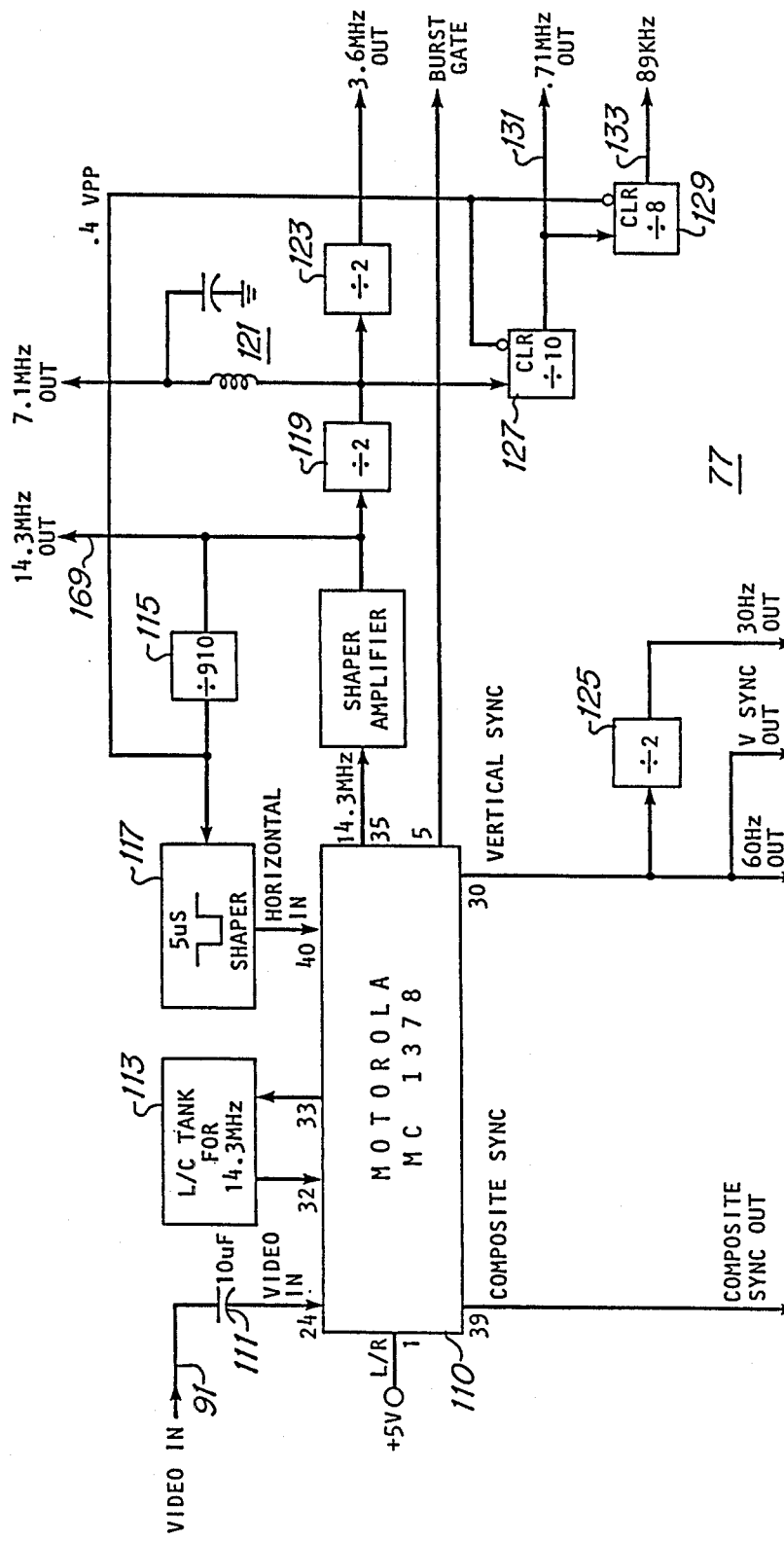
FIG. 10(b) is a block schematic diagram of the sync separation and system timing circuitry of the present invention.

Referring now to FIG. 10(b), there is shown a block schematic diagram of the sync separator and system timing block 77 of FIG. 10(a). A standard integrated circuit 110 (type MC 1378 produced by Motorola Corporation) is connected through a capacitor 111 to receive the incoming video 91 at pin 24, for example, from the standard video cassette recorder 93 of FIG. 10(a). An external tank circuit 113 is connected between pins 32 and 33 to form a 14.3 megahertz oscillator (i.e. tuned to a frequency which is four times higher than the basic NTSC standard color-carrier frequency). This 14.3 megahertz signal is available on pin 35 to be amplified, divided and shaped as required, and is applied to the audio decoder 95 of FIG. 10(a). In addition, the 14.3 megahertz signal is divided by divider 115 and shaped by pulse shaper 117 into a pulse of 5 microsecond width for application to pin 40 as the horizontal input timing pulse. This forms a phase-locked loop that synchronizes the 14.3 megahertz signal with standard 63.5 microsecond horizontal scan lines. Thus, exactly 910 cycles of the 14.3 megahertz signal occurs in the interval of each horizontal scan line. With +5 volts applied to pin 1, the integrated circuit 110 is thus able to synchronize on incoming video 91 to separate out the video composite sync signal at pin 39 (applied to the central processor 73 of FIG. 10(a)), and the vertical sync signal at pin 30 (applied to the field store 79 of FIG. 10(a), and the burst-gate signal at pin 5 (applied to the audio decoder 95 of FIG. 10(a)). Also, the 14.3 megahertz signal produced by the integrated circuit 110 is divided by 2 in divider 119 and shaped substantially to a sinewave in network 121 for application to the field store circuit 79 of FIG. 10(a). In addition, the 7.1 megahertz signal from divider 119 is further divided by 2 in divider 123 to provide the 3.58 megahertz signal that is applied as the basic clock signal to the central processor 73 of FIG. 10(a).

The vertical sync signal appears at pin 30 of the integrated circuit 110 approximately 60 times per second, and this signal is also applied to the central processor 73 at FIG. 10(a) to assure that changes in selected video fields can occur in synchronized, timely, manner. These vertical sync signals (and the divided-by-two version available at the output of divider 125) are supplied to the field store 79 of FIG. 10(a) to assure synchronized field storing operation on the beginning of a selected video field.

The 7.1 megahertz signal at the output of divider 119 is also divided by 10 in scale-of-ten divider 127 to provide the 710 kilohertz output signal 131 that is supplied to the 8-bit shift register 83 of FIG. 10(a) as the bit-shifting clocking frequency for down loading data from incoming video signal 91, as previously described. In addition, the 710 kilohertz signal is further divided by 8 in the scale-of-eight divider 133 to supply 89 kilohertz signal to the central processor 73 of FIG. (10)a as a synchronized indication that 8-bits of data have been shifted into this register 83 and are ready for downloading to the processor 73, as previously described herein. These dividers 127 and 129 may be scaler counters which are reset to zero by the horizontal sync signal at the output of divider 115. All frequencies described herein are referred to by nominal values, but it should be understood that exact multiple values are actually present in the operation of the present invention.

Figure 10C:
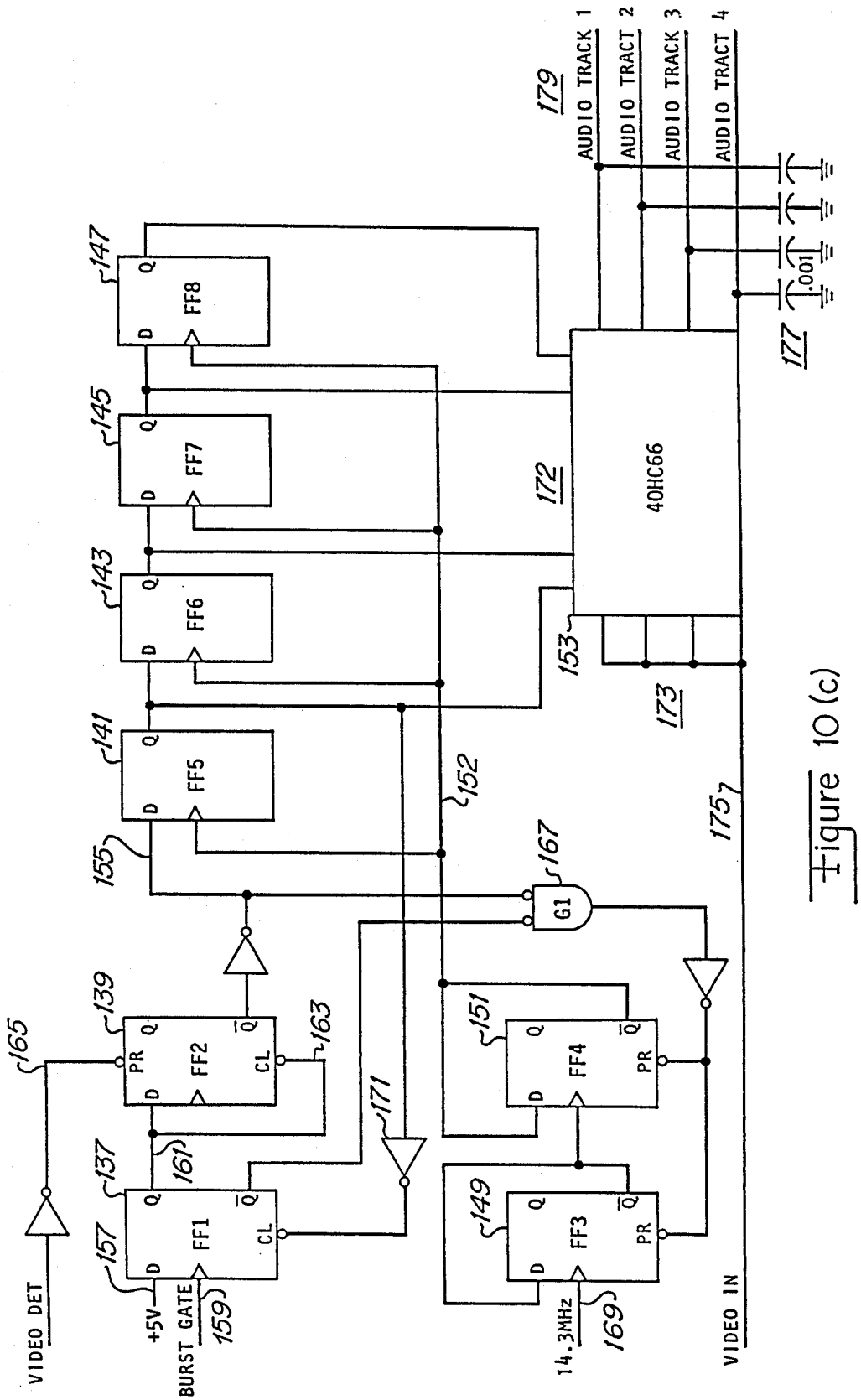
FIG. 10(c) is a block schematic diagram of an audio decoder according to one embodiment of the present invention.
Figure 10:
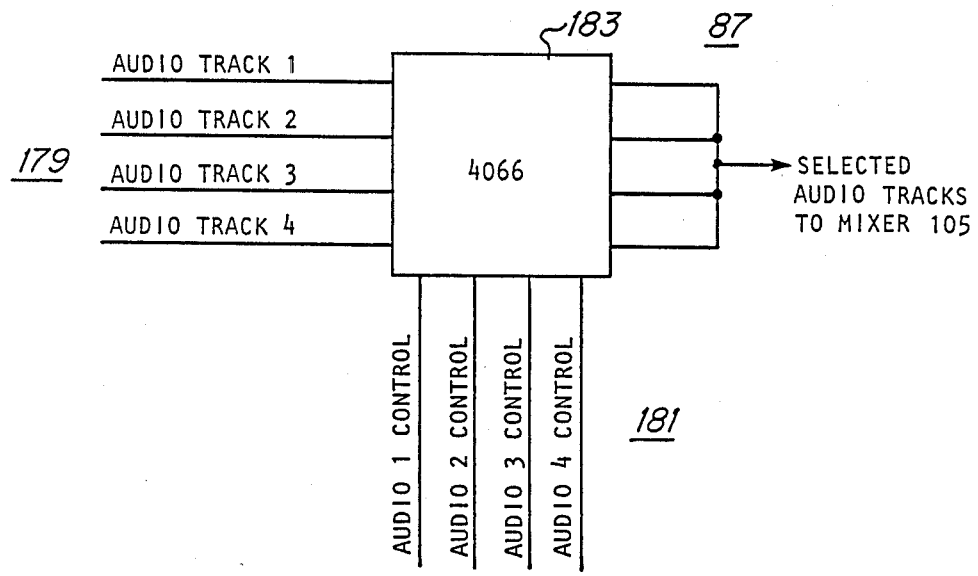
FIG. 10(d) is a block schematic diagram of the audio selector in accordance with the embodiment illustrated in FIG. 10(c)

Referring now to FIG. 10(c), there is shown a block schematic diagram of the audio decoder 95 of FIG. 10(a). This circuit includes 8 flip-flops 137-151 and a conventional analog switch 153 (for example, type 40HC66 integrated circuit). In operation, the flip-flops 137, 139, 141, 143, 145, 147 are initially cleared to the zero state. The 14.3 megahertz signal previously described is applied to flip-flop 149 which divides the frequency by two for application to flip flop 151 which again divides the frequency by two for application as a 3.58 megahertz signal 152 to the clock inputs of flip-flops 141, 143, 145 and 147. These latter four flip flops are configured as a shift register of the type in which data applied to the D input 155 of flip flop 141 is sequentially transferred to the next flip-flop in succession at the leading edge of each applied clock signal 152. It should be noted that since the D input 157 of flip-flop 137 is connected to receive +5 volts, that flip-flop 137 also triggers a '1' output 161 in response to the leading edge of the burst gate signal 159 that is applied to the clock input of flip-flop 137. The '1' output 161 from flip-flop 137 transfers to the D input of flip-flop 139 and also deactuates its 'clear' input 163. The next video signal 165 of sufficient level to be detected as a '1' (i.e. detecting video white level), and applied to the preset input of flip flop 139, sets the flip flop. This, in turn, supplies a '1' output to D input of the first flip flop 141 in the shift register configuration.

In addition, the combination of flip flop 37 being set and flip flop 139 being reset provides two low-enable signals to the gate 167, the output of which is inverted and provides a preset to flip flops 149 and 151. These flip flops are configured as a divide-by-4 counter. Thus, the combination of flip flop 137 being set and flip flop 133 being reset has the effect of holding flip-flops 149 and 151 at a count of 3 during the time between when the leading edge of the burst gate appears and when video white level is detected. As soon as the video white level is detected, the very next cycle of 14.3 megahertz signal 169 resets both flip flops 149 and 151 from their 3 count value to a 0 count equivalent value. This provides a '1' pulse that is clocked into flip flop 141. This causes a '1' output from flip-flop 141 which is supplied to flip flop 137. The clearing of flip flop 137, in turn, cause flip flop 133 to be cleared, thus removing the '1' input to the D input of flip flop 141 as the single value that will be gated into the shift register comprising flip flops 141-147. Since the clocks of flip flop 141-147 are supplied by the output of flip flop 151 (i.e. the last stage of the divide-by-4-counter), the net effect is that '1' is shifted into flip flop 141 and through the succeeding flip flops 143, 145 and 147 at the 3.58 megahertz rate.

The output of each of those flip flops in turn presents the '1' signal to the four inputs 172 of the four stages of analog switch 153. The inputs 173 to the analog switch are also connected to the video-in line 175 so that when each stage in succession is turned on, each of the outputs seizes a sample of the video input for 280 nanoseconds sample width. The samples are stored in the capacitors 177 which are connected to the respective audio track outputs 179. The sample-and-hold effect of the switches 153 and capacitors 177 per audio track allows the recovery of the audio signals from those samples at the specific locations immediately following detection of the video white level, as shown in FIG. 2(d).

Referring now to FIG. 10(d), there is shown a block diagram of the audio selector 87 which is connected to receive the four audio-track outputs 179 from the audio decoder 172 of FIG. 10(c). Under control of the central processor 73, any combination of the four control lines 181 that lead into the analog switch 183 of conventional integrated circuit configuration (for example, type 4066) may be enabled or disabled to pass any combination of audio track 1-4 through the switch 183 to constitute the selected audio tracks for application to the audio mixer 105 of FIG. 10(a).

Figure 11A:
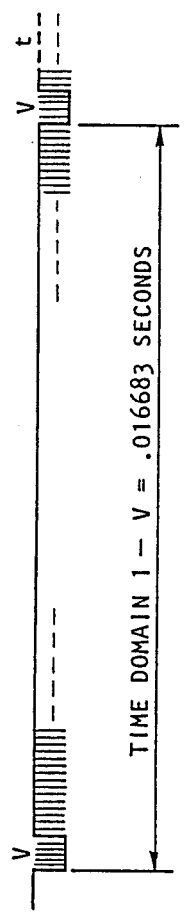
FIGS. 11(a) and (b) are graphs showing television vertical and horizontal sync intervals, respectively.
Figure 11B:
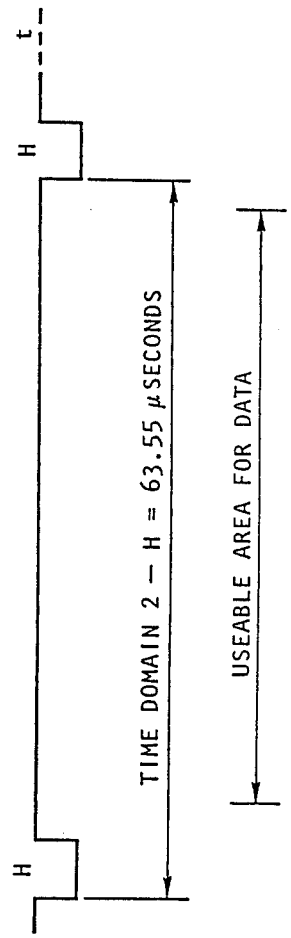
Figure 12:
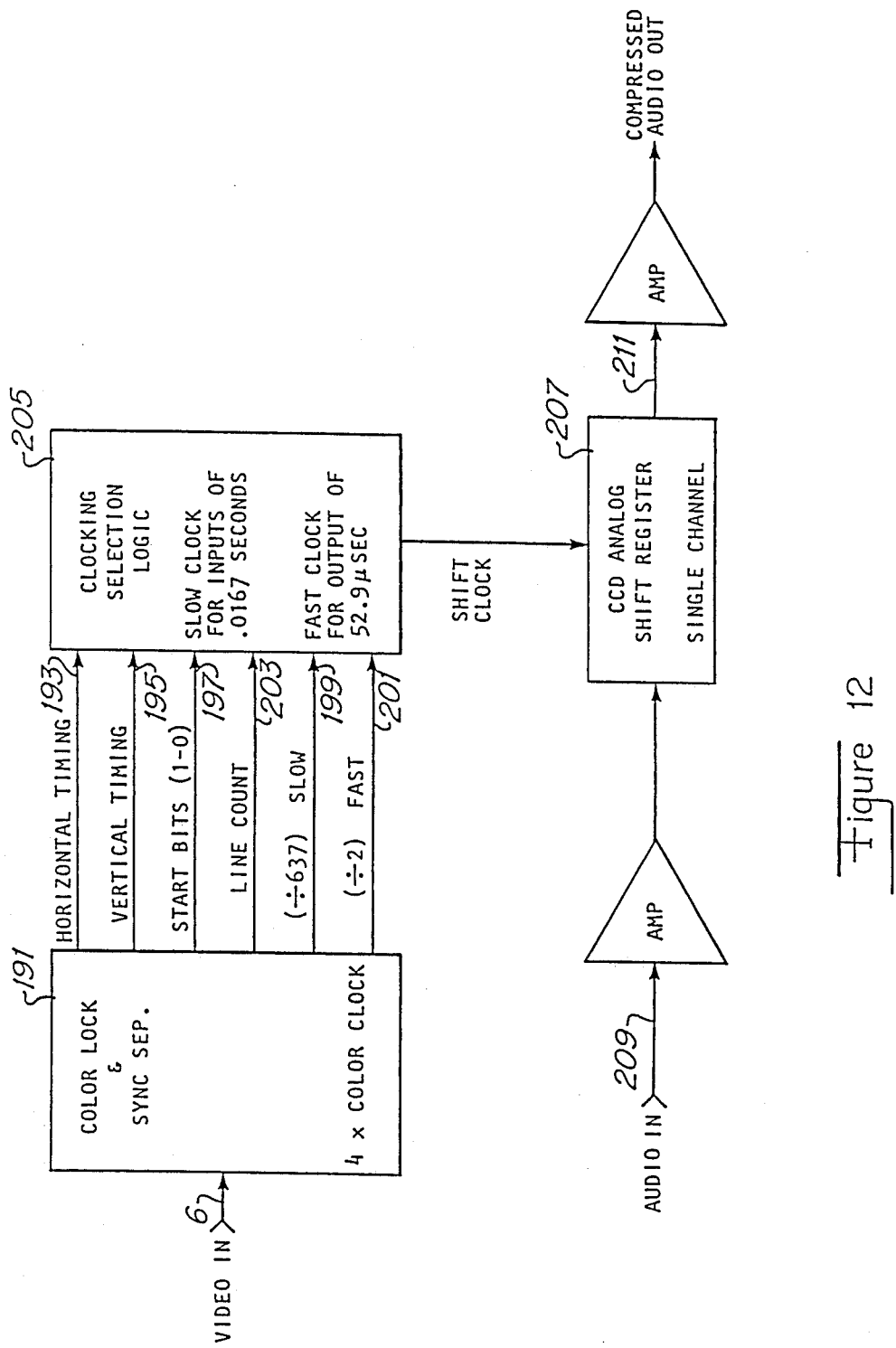
FIG. 12 is a block schematic diagram of an embodiment of a compressed audio encoder.

Referring now to FIGS. 11(a) and (b) there are shown graphs of the vertical and horizontal sync pulses which are the bases for operation of the compressed audio embodiment of the present invention. In operation the compression and expansion of the audio signals is controlled with respect to timing signals derived from the video fields in which it is inserted, or from which it is retrieved. Thus, as illustrated, the audio signals in the time domain of the vertical sync pulse interval, FIG. 11(a), is compressed to fit within the time domain of the horizontal sync pulse interval FIG. 11(b). The video circuitry preceding the audio compression encoder recovers the color subcarrier and creates a master clock of 14.3 megahertz. A frequency at half the master clock frequency, or 7.16 megahertz and a frequency of one 637th of the master clock frequency are derived from the master clock. As illustrated in the block schematic diagram of an audio encoder shown in FIG. 12, a color lock and sync separator circuit 191 of conventional design extracts horizontal and vertical timing signals 193, 195 from the video input 6. The start bits 197 constitute a full "white" level video signal for a logical '1' and the next bit is a "black" level video signal for a logical '0'. The master clock frequency is divided by 637 and by 2 to provide the control frequencies 199 and 201, along with horizontal line count 203, to the clocking selection logic 205.

An analog shift register 207 of conventional design (for example, type CCD 321B integrated circuit produced by Fairchild Semiconductor Co.) is normally operable as a delay line to delay a line of video for possible restoration or replacement of a "dropped out" line of video in a video cassette recorder, or the like. However, according to this embodiment of the present invention, audio signal in the time span of the duration of one video field is compressed in the analog shift register 207 into the time span of one horizontal scan or trace of a video field. In such a conventional analog shift register 207, there are two 455-sample registers, and one such register can be clocked at 7.16 megahertz to receive or produce 455 samples in the time interval of one horizontal scan. The resulting audio compression ratio of 318.5 is selected because 375 samples can be clocked in at 1/637the of the master clock frequency in about 53 microseconds, or about the usable time interval of one horizontal scan. Thus, the audio input 209 can be clocked into the shift register 207 at about 22,477.5 hertz (i.e. about 11 kilohertz bandwidth), commencing with the start bits 197, for 375 successive samples. A quick burst of 80 clock pulses fills the 455-sample register and produces the first audio sample at the output 211 for placement in the video signal in a manner similar to that which was previously described in connection with FIGS 5-9. Specifically, when the selected horizontal scan line of the next video field starts and the horizontal blanking is completed, 377 samples are shifted out of the shift register 207 into the video signal at the 7.16 megahertz rate. This process can be repeated to add more channels of audio to additional horizontal scan lines, with the '1'-'0' start bits at the beginning of each such audio/video scan line. Thus, the audio information is only placed on selected horizontal scan lines in video field lines that are reserved for signal information. Also, using a pair of similar analog shift registers can provide two audio channels of "good" quality for recovery as stereo signal channels.

Figure 13:
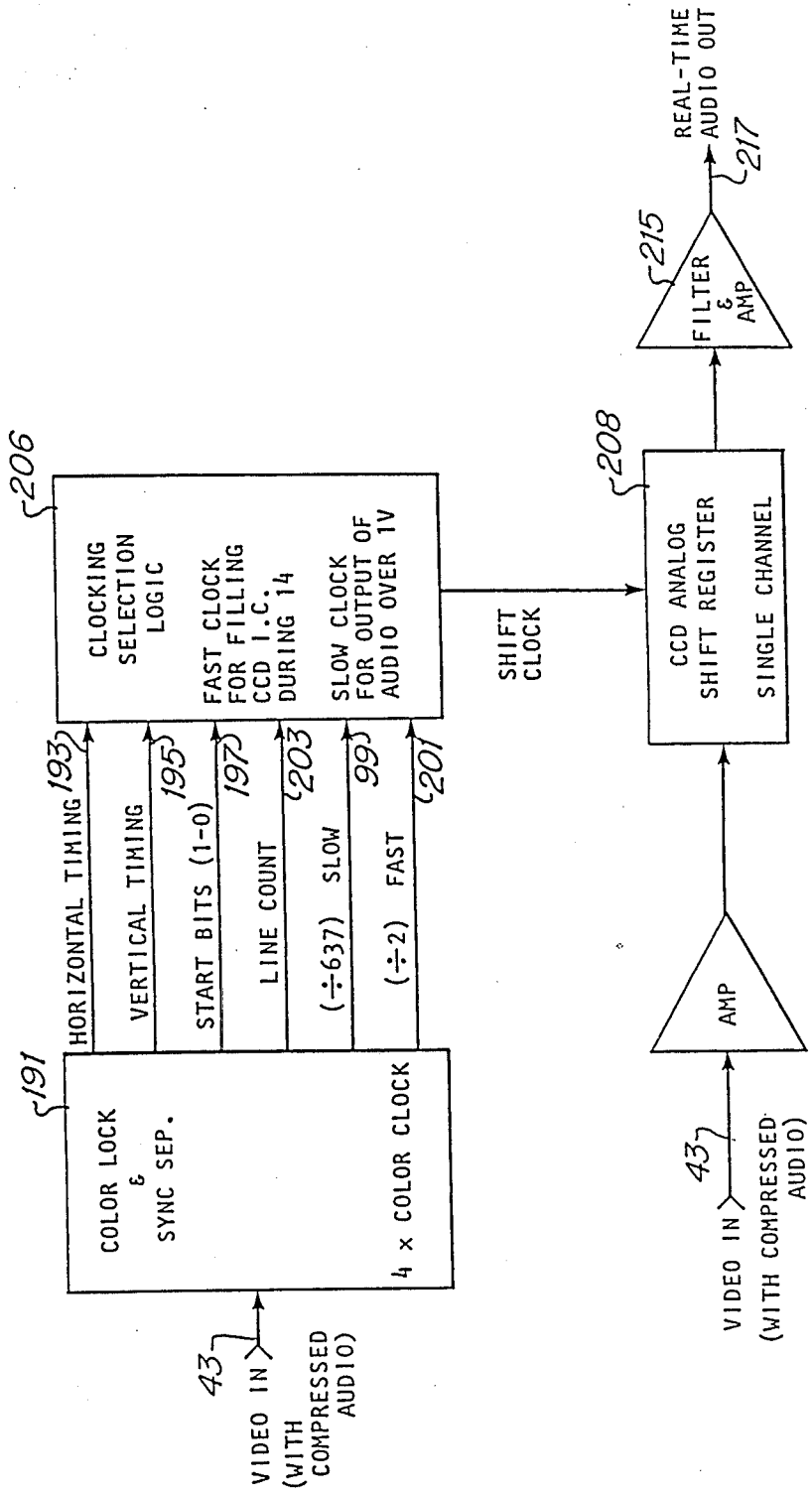
FIG. 13 is a block schematic diagram of an embodiment of a compressed audio decoder.

Referring now to FIG. 13, there is shown a block schematic diagram of a decoder according to an embodiment of the present invention. Specifically, similar conventional circuits operate in the manner previously described to derive the required timing signals from the video input 43 (with compressed audio) for application to the clocking selection logic 206. Also, the video input 43 (with compressed audio) is applied to the analog shift register 208 which is controlled by the clocking selection register 206 to fill the register with the compressed audio samples, commencing with the '1'-'0' start bits and continuing for one horizontl scan interval, and thereafter to clock out the stored samples at the rate of 22,477.5 hertz into conventional filter and amplifier 215 to provide the real-time audio output 217.

I claim:

1. Apparatus for forming multi-program composite video display signals from the video display signals from at least three sources of displayable programs, the apparatus comprising:

switch means having an output and having inputs coupled to receive the video display signals from said at least three sources for displaying successive fields of the individual displayable programs, said switch means being operable in at least three operating states for selecting in each operating state a video display signal for displaying a field of the displayable program from one of said at least three sources;

control means coupled to control the operating state of the switch means for altering the operating state thereof to couple said output in selectable sequence to receive at a selected input the video display signal for displaying one field of a displayable program from the one of said at least three sources that is coupled to such selected input for producing at said output a composite video display signal which includes an arbitrary sequence of interleaved video display signals from separate ones of said at least three sources, each such video display signal for displaying one field of one displayable program.

2. Apparatus as in claim 1 wherein:

the inputs of said switch means are coupled to receive video display signals from at least three sources of individual displayable programs, and said control means alters the operating state of the switch means to couple the output thereof for producing at said output a composite video display signal having a succession of interleaved video display signals, each for displaying one field of one displayable program from one of said at least three sources in selected succession.

3. Apparatus for producing a composite video signal for displaying selectable successive video fields of a plurality of displayable programs, the apparatus comprising:

means producing a plurality of horizontal traces of video field information for displaying selected video fields of each of the displayable programs; and coder means coupled to said means for including on selected horizontal traces of the video field information for each video field of each selectable displayable program non-displayable coded signals representative of the selectable program and the successive field thereof for designating the entire field of a selected program for display in response to detection of said coded signals in the video field information of said designated field.

4. Apparatus for producing a composite video signal for displaying selectable successive video fields of a plurality of displayable program, the apparatus comprising:

means producing a plurality of horizontal traces of video field information for displaying selected video fields of each of the displayable programs; and coder means coupled to said means for including on selected horizontal traces of the video field information for each video field of each selectable displayable program non-displayable coded signals representative of the selectable program and the successive field thereof for designating the entire field of a selected program for display in response to detection of said coded signals in the video field information of said designated field; and said coded signals representative of program and field designations being included on selected ones of the tenth through twentieth horizontal traces of a video field.

5. Apparatus for producing a composite video signal for selectively displaying successive video fields of a displayable program, the apparatus comprising:

means for producing a plurality of horizontal traces of video field information for displaying successive video fields of the displayable program; and circuit means coupled to said means for interposing on selected horizontal traces of said video field information for successive video fields of the displayable program a compressed selection of audio signal information over an interval longer than the interval of the selected horizontal traces.

6. Apparatus as in claim 5 for producing a composite video signal for displaying successive fields of a plural number of displayable programs, wherein said means produces a sequence of video field information for successive video fields of the plural number of displayable programs in which each video field includes a plurality of horizontal traces, and wherein said circuit means interposes a compressed selection of audio signal information for each of the plural number of displayable programs on selected horizontal traces of said video field information.

7. A method of producing composite video signals for selectively displaying successive video fields in vertical synchronizing intervals of a displayable program, the method comprising the steps of:

producing a plurality of horizontal traces of video field information for displaying successive video fields of the displayable program;

interposing on selected horizontal traces of said video field information for successive video fields of the displayable program a compressed selection of audio information over an interval longer than the interval of the selected horizontal traces.

8. The method according to claim 7 wherein in the step of interposing, the selection of audio information over the interval substantially between vertical synchronizing intervals is compressed for interposition upon a selected horizontal trace.

9. A method of reproducing compressed audio information on selected horizontal traces of composite video signals for displaying successive video fields in vertical synchronizing intervals of a displayable program, the method comprising the steps of:

detecting the selected horizontal trace and retrieving audio information from the selected horizontal trace within the interval thereof; and reproducing the retrieved audio information over a substantially longer interval.

10. The method according to claim 1 wherein in the step of reproducing, the retrieved audio information is reproduced substantially over the vertical synchronizing interval.

* * * * *